US007637152B2

(12) United States Patent
Ushigusa et al.

(10) Patent No.: US 7,637,152 B2
(45) Date of Patent: Dec. 29, 2009

(54) FLOW METER AND FLOW-REGULATING SYSTEM USING THE SAME

(75) Inventors: Yoshihiro Ushigusa, Gyoda (JP); Hiroki Igarashi, Gyoda (JP); Masahiro Hasunuma, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 86 days.

(21) Appl. No.: 11/916,526

(22) PCT Filed: Apr. 3, 2006

(86) PCT No.: PCT/JP2006/307060

§ 371 (c)(1),
(2), (4) Date: Dec. 4, 2007

(87) PCT Pub. No.: WO2006/132025

PCT Pub. Date: Dec. 14, 2006

(65) Prior Publication Data

US 2009/0078038 A1 Mar. 26, 2009

(30) Foreign Application Priority Data

Jun. 7, 2005 (JP) .............................. 2005-167073

(51) Int. Cl.
*G01F 5/00* (2006.01)
*F16K 17/00* (2006.01)
(52) U.S. Cl. ...................... 73/202; 137/458; 137/596.17
(58) Field of Classification Search .................. None
See application file for complete search history.

(56) References Cited

U.S. PATENT DOCUMENTS 4,760,732 A * 8/1988 Bredeweg et al. .......... 73/23.24
5,803,507 A * 9/1998 Vu ............................... 285/23

FOREIGN PATENT DOCUMENTS

| JP | H02-141821 | | 11/1990 |
| JP | H05-341850 | A | 12/1993 |
| JP | H11-316144 | A | 11/1999 |
| JP | H11-153462 | A | 12/2007 |

* cited by examiner

*Primary Examiner*—Harshad Patel
(74) *Attorney, Agent, or Firm*—Barnes & Thornburg LLP

(57) ABSTRACT

Provided are a flow meter and a flow-rate control system using the same that is capable of measuring a flow rate in a minute flow-rate region with excellent measurement accuracy by preventing or suppressing the generation of bubbles and in which accumulation of the fluid and the bubbles is less likely to occur. The flow meter is for measuring a minute flow rate of a fluid flowing through a fluid channel whose outlet environment is set to constant pressure, the flow meter including a flow-rate measurement conduit portion having a predetermined length connected to an outlet-side end of the fluid channel 1 and whose outlet environment is set to constant pressure by setting the cross-sectional area of a channel smaller than the fluid channel; a pressure sensor for detecting the pressure of the fluid at the upstream side of the flow-rate measurement conduit portion by being disposed near an outlet of the fluid channel 1; and a pressure-detection control unit 4 for calculating a flow rate from a fluid pressure detected at the pressure detection part.

13 Claims, 11 Drawing Sheets

FIG. 7
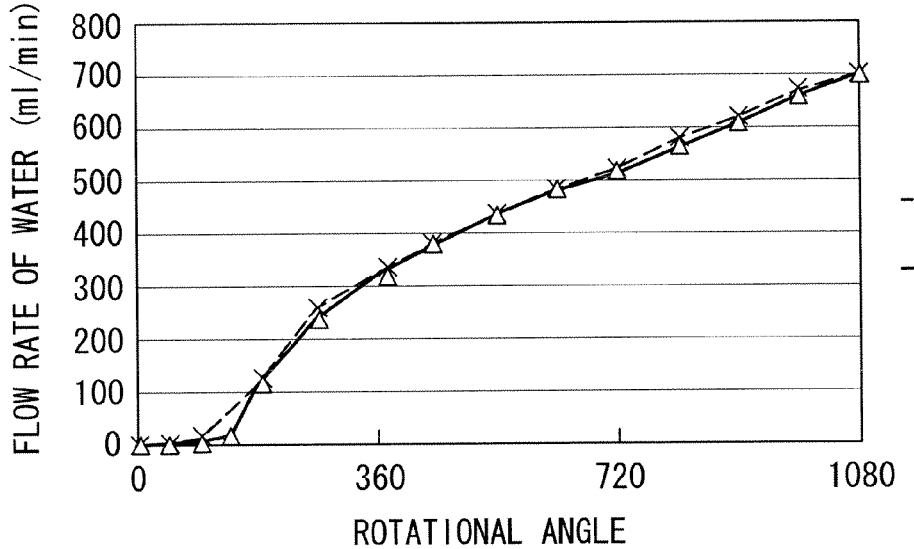
(a)
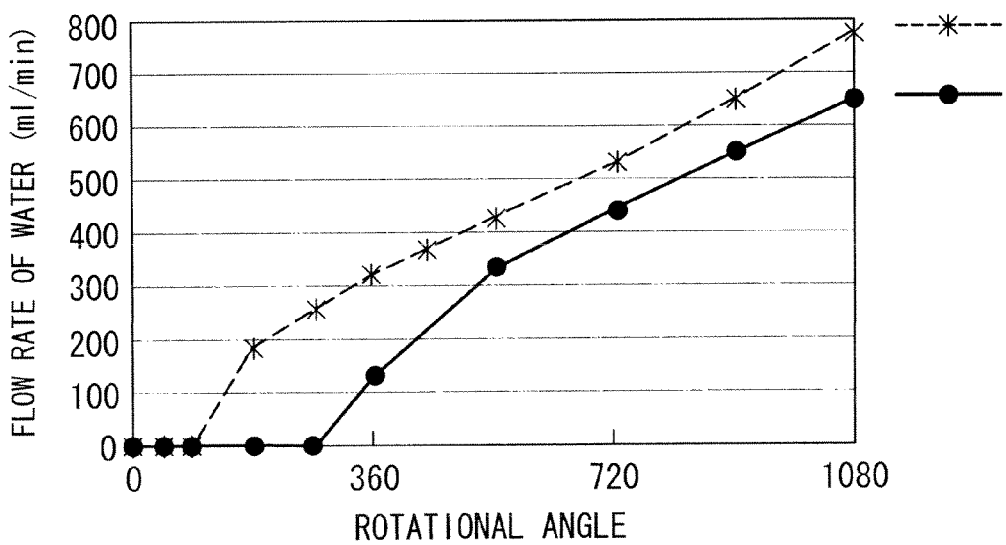
(b)

FLOW METER AND FLOW-REGULATING SYSTEM USING THE SAME

CROSS-REFERENCE TO RELATED APPLICATIONS

This application is a National Phase Application based upon and claiming the benefit of priority to PCT/JP2006/307060, filed on Apr. 3, 2006, which is based upon and claims the benefit of priority to Japanese Patent Application No. 2005-167073, filed Jun. 7, 2005, the contents of both of which are incorporated herein by reference.

TECHNICAL FIELD

The present invention relates to a flow meter used for controlling chemical injection at a minute flow rate in, for example, a wafer cleaning line of a semiconductor production apparatus and relates to a flow-rate control system using the same.

BACKGROUND ART

In the past, flow meters, connected in-line to a fluid circuit, for measuring the flow rate of a fluid flowing through a channel have been widely adopted. Known examples of such flow meters include meters provided with an orifice, a Venturi nozzle, a pilot tube and the like installed in an appropriate location in the channel and that employ a differential-pressure method in which flow rate is measured from the pressure difference caused by a throttle. Since such a differential-pressure flow meter is used in a region where the fluid usually exhibits turbulent flow, the flow rate becomes large, thus easily causing cavitation.

Since the above-described differential-pressure flow meter has, in addition to the problem of a pressure drop, a problem in that the cost increases to achieve a certain processing accuracy, a flow meter that includes, for example, a pair of probes having slits opening to the channel and that detects the pressure difference of the fluid entering the probes has been proposed. This differential-pressure flow meter is a flow meter that satisfies the principle of dynamic-pressure measurement, has improved measurement accuracy, has a simple structure, and can be manufactured at low cost. (For example, see Patent Document 1.)

Patent Document 1: Japanese Unexamined Patent Application, Publication No. HEI-11-316144

DISCLOSURE OF INVENTION

The above-described known differential-pressure flow meter has a problem in that when it is disposed in the fluid channel whose outlet side is open to the atmosphere, bubbles are generated at the downstream side (the secondary side) throttled by the orifice. Since the generated bubbles tend to accumulate at the pressure sensor disposed on the secondary side and flow out as a cluster after accumulating, the generation of such bubbles not only negatively affects the flow-rate measurement accuracy, particularly in a minute flow-rate region, but also causes a problem in that, if the fluid channel is a wafer cleaning line in a semiconductor production apparatus, the products are negatively affected by a cleaning solution containing bubbles generated at the differential-pressure flow meter pouring onto the wafer. To prevent the generation of such bubbles, the actual measure taken in a known wafer cleaning line and so on is to apply backpressure to the orifice of the differential-pressure flow meter. Here, the minute flow rate is approximately 1 liter/min.

In general, the various devices connected to a channel use holes formed in a block-shaped body as part of the channel. However, when the channel is curved, the entire channel cannot be formed by one drilling process. Therefore, in such a case, to form a hole that connects the inlet to the outlet in that body, a plurality of holes is formed in the body along the straight portions of the channel, and then unwanted openings (openings other than the inlet and outlet of the channel) of these holes are backfilled, using plugs and so on.

However, in a body having such a structure, since spaces are created in sections other than the channel where the holes are buried, the fluid tends to accumulate in these spaces.

Because of this situation, there is a demand for the development of a flow meter that is capable of preventing or suppressing the generation of bubbles and maintaining sufficient measurement accuracy in a minute flow rate area, and that is less likely to cause accumulation of fluid and bubbles.

The present invention has been conceived in light of the problems described above. Accordingly, it is an object of the present invention to provide a flow meter and a flow-rate control system that prevents or suppresses the generation of bubbles, maintains sufficient measurement accuracy in a minute flow rate area, and is less likely to cause accumulation of fluid and bubbles.

To solve the above-described problems, the present invention provides the following solutions.

A flow meter according to the present invention is a flow meter for measuring a minute flow rate of a fluid flowing through a fluid channel having an outlet environment of constant pressure, the flow meter including a flow-rate measurement conduit portion having a predetermined length connected to an outlet-side end of the fluid channel and whose outlet environment is set to constant pressure by setting the cross-sectional area of a channel smaller than the fluid channel; pressure detection part for detecting the pressure of the fluid at the upstream side of the flow-rate measurement conduit portion by being disposed near an outlet of the fluid channel; and pressure/flow-rate conversion part for calculating a flow rate from a fluid pressure detected at the pressure detection part.

It is preferable that, with the flow meter according to the present invention, the outlet environment of constant pressure be atmospheric pressure due to an opening to the atmosphere.

By setting the outlet position of the above-described flow-rate measurement conduit portion higher than the pressure detection part, the measurement values of the flow rate can be stabilized.

Since the above-described flow meter according to the present invention includes a flow-rate measurement conduit portion having a predetermined length connected to an outlet-side end of the fluid channel and whose outlet environment is set to constant pressure by setting the cross-sectional area of a channel smaller than the fluid channel; pressure detection part for detecting the pressure of the fluid at the upstream side of the flow-rate measurement conduit portion by being disposed near an outlet of the fluid channel; and pressure/flow-rate conversion part for calculating a flow rate from a fluid pressure detected at the pressure detection part, a pressure difference is generated by throttling the cross-sectional area of the channel by the flow-rate measurement conduit portion having a predetermined length. Thus, the flow meter is a differential-pressure flow meter that is capable of calculating the flow rate on the basis of this pressure difference.

In the flow-rate measurement conduit portion according to the present invention, since the cross-sectional area of does not suddenly increase immediately after the throttling and includes a rectifying section, the generation of bubbles is significantly reduced and the generated bubbles tends to be eliminated in the rectifying section. Therefore, the amount of bubbles that reach the outlet and flow out together with the fluid is significantly reduced.

If the outlet environment is set to atmospheric pressure by opening to the atmosphere, the bubbles that flow out vanish by dispersing into the atmosphere.

It is preferable that, in the above-described flow-rate measurement conduit portion, the conduit length L be set to approximately 50 cm to 3 m and the inner diameter d be set to 2 mm or smaller to accurately measure, for example, a minute flow of approximately 1 ml/min in a laminar flow state. It is more preferable to set the inner diameter d of the flow-rate measurement conduit portion to 1 mm or smaller, and it is most preferable to set the inner diameter d to 0.5 μm or smaller.

The material of the flow-rate measurement conduit portion is not limited so long as a thin channel can be formed. However, in consideration of chemical resistance, for a semiconductor production apparatus, it is preferable to use a thermoplastic resin such as PFA or PTFE, or an engineering plastic called PEEK. Because of the excellent mechanical strength, thermal resistance, and chemical resistance, thermal deformation and so on that cause measurement errors can be prevented.

Since the above-described flow meter has high measurement accuracy for a minute flow rate and is capable of minimizing the generation of bubbles, it is preferable for controlling the flow rate of a chemical solution when mixing a chemical solution with pure water at a minute flow rate.

The flow-rate control system according to the present invention includes a flow-rate control valve; the flow meter according to the present invention; and a block-shaped body, one surface of which is provided the flow-rate control valve and the flow meter, and inside of which is provided with a fluid channel connecting the flow-rate control valve and the flow meter; wherein the fluid channel includes a first inclined channel gradually inclined to an area in which the flow meter is provided, as the first inclined channel is inclined from an area of the surface where the flow-rate control valve is provided to the inside of the body, and a second inclined channel gradually inclined to an area in which the flow-rate control valve is provided, as the second inclined channel is inclined from an area of the surface where the flow meter is provided to the inside of the body, the second inclined channel being connected to an end of the first inclined channel.

In the flow-rate control system having such a structure, the flow-rate control valve and the flow meter according to the present invention share the same body. In other words, in this flow-rate control system, the flow-rate control valve and the flow meter are integrated, thus improving handling.

The flow-rate control valve and the flow meter are provided on a side of the body and are connected by a fluid channel provided inside the body.

In the fluid channel, the area connecting the flow-rate control valve and the flow meter is substantially V-shaped and is formed of a first inclined channel and a second inclined channel that are inclined with respect to a surface of the body.

In other words, in the fluid channel, the area connecting the flow-rate control valve and the flow meter is formed of two inclined holes formed from one side of the body. In this way, the shape of the fluid channel is simple, and accumulation of the fluid is less likely to occur in the fluid channel.

Moreover, in this way, since, in the fluid channel, the area connecting the flow-rate control valve and the flow meter is formed by forming two inclined holes, the holes do not have to be buried. Thus, minimum processing of the body is required, and production is facilitated.

In this flow-rate control system, at least part of the fluid channel may be inclined such that the outlet side is positioned above the inlet side.

In the flow-rate control system having such a structure, since at least part of the fluid channel may be inclined such that the outlet side is positioned above the inlet side, for bubbles that are generated in this area or bubbles that flow into this area, buoyancy of these bubbles acts toward the outlet of the fluid channel.

Therefore, even when the flow rate of the fluid flowing through the fluid channel is extremely small, the bubbles easily move toward the outlet of the fluid channel, and bubbles are less likely to accumulate inside the fluid channel.

The above-described flow-rate control system may further include a base placed on an upper surface of base, wherein the upper surface of the base may be an inclined surface gradually inclined upward from the inlet side of the fluid channel to the outlet side of the fluid channel.

In a flow-rate control system having such a structure, since the upper surface of the base is an inclined surface, the body disposed on the base is positioned such that the side on the outlet side of the fluid channel is higher compared to when the base is not provided.

In this way, the height difference of the inlet side and the outlet side is reduced in the fluid channel inside the body in the section where the inlet side and the outlet side are at the same heights, at the position of the outlet side is higher, and the section where the inlet side is higher than the outlet side, In either section, bubbles more easily move toward the outlet side of the fluid channel and are less likely to accumulate.

In the above-described flow-rate control system, the flow-rate control valve may include a motor attached to the body, and a valve element connected to a rotary shaft of the motor with a threaded portion; an alignment reference surface may be provided on the motor; a fixing member for fixing the motor may be provided on the body; and the fixing member may include an alignment surface for aligning the motor by receiving the alignment reference surface of the motor and setting at least one of the position and the orientation of the rotary shaft in a manner suitable for driving the valve element.

In such a flow-rate control system, since the alignment reference surface of the motor contacts the alignment surface of a fixing member provided on the body, the position, the orientation, or both the position and the orientation of the rotary shaft of the motor is set in a manner suitable for driving the valve element. Therefore, an alignment adjustment operation, an orientation adjustment operation, or both the alignment adjustment operation and the orientation adjustment operation of the motor with respect to the body become unnecessary.

Therefore, according to the flow-rate control valve, highly accurate assembly can be easily and quickly carried out during production and maintenance, regardless of the technical skills of the assembly worker. Accordingly, the flow-rate control valve has excellent productivity and operability, has less variation in the assembly accuracy for each product or maintenance operation, and is capable of maintaining excellent performance.

Here, the alignment reference surface can be formed of one or more curved surfaces or a plurality of flat surface in which at least one surface is disposed in a direction different from the other surfaces. When the alignment reference surface is a curved surface, the corresponding alignment surface is formed of a curved surface having the same curvature in the opposite direction. When the alignment reference surface is formed of a plurality of flat surfaces, the alignment surface for the connected member is formed of a plurality of flat surfaces corresponding to the alignment reference surface.

In this flow-rate control system including the alignment reference surface and the alignment surface, the alignment reference surface of the motor may be a cylindrical surface or a cylindrical inner surface parallel to the rotary shaft; and the alignment surface of the fixing member may be a cylindrical inner surface or a cylindrical surface that is parallel to the driving direction of the valve element and has the same shape as the alignment reference surface, and the position and the orientation of the rotary shaft are set when the alignment surface receives the alignment reference surface.

In this flow-rate control system, when the alignment reference surface of the motor of the flow-rate control valve is a cylindrical surface, the alignment surface of the fixing member is a cylindrical inner surface having substantially the same shape as the alignment reference surface, and, by inserting the alignment reference surface of the motor into the inner circumferential side of the alignment surface of the fixing member to engage the motor and the fixing member, the position and orientation of the motor are set with respect to the body.

In this flow-rate control system, when the alignment reference surface of the motor of the flow-rate control valve is a cylindrical inner surface, the alignment surface of the fixing member is a cylindrical surface having substantially the same shape as the alignment reference surface, and, by inserting the alignment surface of the fixing member into the inner circumferential side of the alignment reference surface of the motor to engage the motor and the fixing member, the position and orientation of the motor are set with respect to the body.

In other words, in this flow-rate control system, since the motor of the flow-rate control valve and the fixing member are connected by a so-called spigot coupling, by merely connecting the motor and the fixing member, the position and orientation of the motor are set with respect to the body, and production is facilitated.

The above-described flow-rate control system including the alignment reference surface and the alignment surface may further include a stopper for allowing the movement of the valve element within a predetermine operating range and limiting the movement outside the operating range by receiving the valve element upon reaching the end of the operating range.

In this flow-rate control system, the operating range of the valve element is set in advance, and when the valve element reaches the end of the operating range (the boundary between the operating range and outside the operating range), the valve element is received by the stopper, and further movement of the valve element is restricted. In this way, problems such as over-screwing of the threaded portion are reliably prevented.

In this valve element, the operating range set in advance is the actual movable range of the valve element.

The above-described flow-rate control system including the alignment reference surface and the alignment surface may further include a control device for controlling the operation of the motor, wherein the control device may operate the motor by a first driving torque when at least the valve element, when near the end of its movable range, moves to the end, and the control device may operate the motor by a second driving torque greater than the first driving torque when the valve element moves away from the end of the movable range.

In the flow-rate control system having such a structure, when the valve element of the flow-rate control valve is moved away from the end of the movable range, the control device controlling the movement of the motor operates the motor by a second driving torque greater than the driving torque (first driving torque) for moving the valve element to the end of its movable range.

In this way, in the flow-rate control system, even when over-screwing of the threaded portion occurs when the valve element of the flow-rate control valve is moved to the end of the movable range, this over-screwing can be easily eliminated.

Here, the driving toque of the motor is proportional to the amount of the driving current input to the motor.

Accordingly, by configuring the control device such that, when the valve element is moved to the end of the movable range, the output limit value of the driving current for the motor is set to a first limit value and, when the valve element is moved away from the end of the movable range, the output limit value is set to a second limit value that is greater than the first limit value, the driving torque for the motor when the valve element is moved away from the end of the movable range can be set greater than the driving torque for the motor when the valve element is moved to the end of the movable range.

In general, with a motor, the slower the rotation of the rotary shaft is, the greater the torque is for driving the rotary shaft.

Accordingly, by configuring the control device such that, when the valve element is moved to the end of the movable range, the rotary shaft of the motor is rotated at a first rotational speed and, when the valve element is moved away from the end of the movable range, the rotary shaft of the motor is rotated at a second rotation speed that is slower than the first rotational speed, the driving torque for the motor when the valve element is moved away from the end of the movable range can be set greater than the driving torque for the motor when the valve element is moved to the end of the movable range.

In the above-described flow-rate control system including the alignment reference surface and the alignment surface, the valve element may be a needle of a needle valve; the motor may be a stepping motor for rotating the rotary shaft by an angle proportional to the number of pulses in an input pulsed signal; a control device for controlling the position of the valve element by controlling the operation of the motor may be provided; to carry out position calibration of the valve element, the control device may input, to the motor, a pulsed signal having a number of pulses for rotating the rotary shaft by an angle required for moving the valve element from one end to the other end of its movable range; and the control device may determine that the valve element is positioned at the other end of the movable range at the position where the rotary shaft stopped and carries out subsequent position control of the valve element within the movable range.

In this flow-rate control system, instead of determining the position of the valve element of the flow-rate control valve using a rotary encoder, the current position of the valve element is determined by carrying out position calibration by temporarily moving the valve element to the other end of the movable range at an appropriate timing, such as when power is turned on, obtaining the amount of rotation of the rotary shaft after carrying out position calibration on the basis of a pulsed signal subsequently input to the motor, and determining the displacement of the valve element from the other end of the movable range on the basis of the information on the amount of rotation.

More specifically, in the flow-rate control system according to the present invention, to calibrate the position of the valve element, the control device inputs a pulsed signal having a predetermined number of pulses to the motor so as to rotate the rotary shaft of the motor by an angle required to move the valve element from one end to the other end of its movable range (this angle is obtained from the design information of the flow-rate control valve).

In this way, when the rotation of the rotary shaft is completed, the valve element is positioned at the other end of the movable range, regardless of the position (initial position) at the beginning of the position calibration operation. When the valve element is at a position other than an end of the movable range when the position calibration operation of the valve element begins, the valve element reaches the other end of the movable range and cannot move farther before the rotary shaft is rotated by an angle corresponding to all of the pulses in the pulsed signal input to the motor. As a result, after that point, the rotary shaft does not rotate anymore, regardless of the number of remaining pulses.

In this way, after the valve element is positioned at the other end of the movable range, the control device determines that the valve element is positioned at the other end of the movable range and carries out position control of the valve element within the movable range.

Within the movable range, since the rotary shaft rotates by an angle corresponding to all of the pulses in the pulsed signal input to the motor, a fixed relationship is established between the number of pulses in the pulsed signal and the position of the valve element.

In this way, in this flow-rate control system, once the valve element of the flow-rate control valve is positioned at the other end of the movable range, the position of the valve element can be specified on the basis of the number of pulses in the pulsed signal subsequently input to the motor. Accordingly, the position of the valve element can be accurately determined without using a rotary encoder.

Here, the control device configured to carry out position control of the valve element within the movable range may rotate the rotary shaft in a direction in which the valve element moves toward the open side of the movable range to carry out position calibration of the valve element.

In the flow-rate control system having such a structure, to calibrate the position of the valve element, the valve element configuring the needle of the needle valve is moved to the open side of the movable range or, in other words, in the direction that avoids interference with the other members constituting the needle valve. Therefore, even when position calibration of the valve element is repeated, the valve element and the main body of the needle valve are less likely to experience wear.

The control device that carries out position calibration of the valve element within the movable range may operate the motor by a first driving torque when at least the valve element, when near the end of its movable range, moves to the end, and may operate the motor by a second driving torque greater than the first driving torque when the valve element moves away from the end of the movable range.

In the flow-rate control system having such a structure, when the valve element of the flow-rate control valve is moved away from the end of the movable range, the control device controlling the movement of the motor operates the motor by a second driving torque greater than the driving torque (first driving torque) for moving the valve element to the end of its movable range.

In this way, in the flow-rate control valve, even when over-screwing of the threaded portion occurs when the valve element is moved to the end of the movable range, this over-screwing can be easily eliminated.

In the above-described flow-rate control system according to the present invention, a thrust bearing for receiving a thrust load applied to the rotary shaft may be provided on the outside of a motor main body of the motor.

In the flow-rate control system having such a structure, when the valve element of the flow-rate control system receives pressure from a fluid, the thrust load that is to be transmitted to the rotary shaft via the valve element and the threaded portion is received by the thrust bearing provided on the outside of the motor main body and is released to the motor main body. Therefore, the load applied to the support structure of the rotary shaft in the motor is reduced, and thus the performance of the motor can be maintained for a long period of time.

The above-described flow meter according to the present invention comprises a differential-pressure flow meter that generates a pressure difference by throttling the cross-sectional area of the flow-rate measurement conduit portion having a predetermined length and calculates the flow rate on the basis of the pressure difference. Therefore, since there are no areas where the cross-sectional area suddenly increases and a rectifying section having a predetermined length that generates a laminar flow is provided, the amount of bubbles that reach the outlet and flow out together with the fluid is significantly reduced, allowing highly accurate measurement of the flow rate. In other words, there is an advantage in that a flow meter that can prevent or suppress the generation of bubbles due to cavitation by generating a laminar flow and that is capable of a highly accurate measurement of the flow rate in a minute flow rate area is provided. Furthermore, even when bubbles are generated, there are no sections (bumps) in the flow-rate measurement conduit portion in which the bubbles can accumulate. According to an experiment conducted by the inventors, it has been confirmed that, even in a minute flow rate area of approximately 1 ml/min, the flow rate can be measured within an error range of ±10%.

With the flow meter according to the present invention, since the generation of bubbles is reduced, by using this for controlling the injection amount of a chemical solution in a cleaning line of a semiconductor production apparatus, there is a significant advantage in that negative effects on the product (wafer etc.) caused by bubbles in the cleaning solution can be reduced to decrease the number of defective products, and yield can be significantly improved.

With the flow-rate control system according to the present invention, problems such as over-screwing of the threaded portion driving the valve element of the flow-rate control valve are reliably prevented.

With the flow-rate control system according to the present invention, the position of the valve element the flow-rate control valve can be accurately determined without using an expensive rotary encoder.

BRIEF DESCRIPTION OF DRAWINGS

FIG. 7 are graphs illustrating the relationship between the rotational angle of a rotary shaft of a motor and flow rate. FIG. 7(a) illustrates the results of measurements carried out by using the flow-rate control valves shown in FIGS. 4 and 5, and FIG. 7(b) illustrates results of measurements carried out by using a flow-rate control valve according to the related art.

BEST MODE FOR CARRYING OUT THE INVENTION

First Embodiment

A flow meter according to a first embodiment of the present invention will be described below with reference to the drawings.

Figure 1:
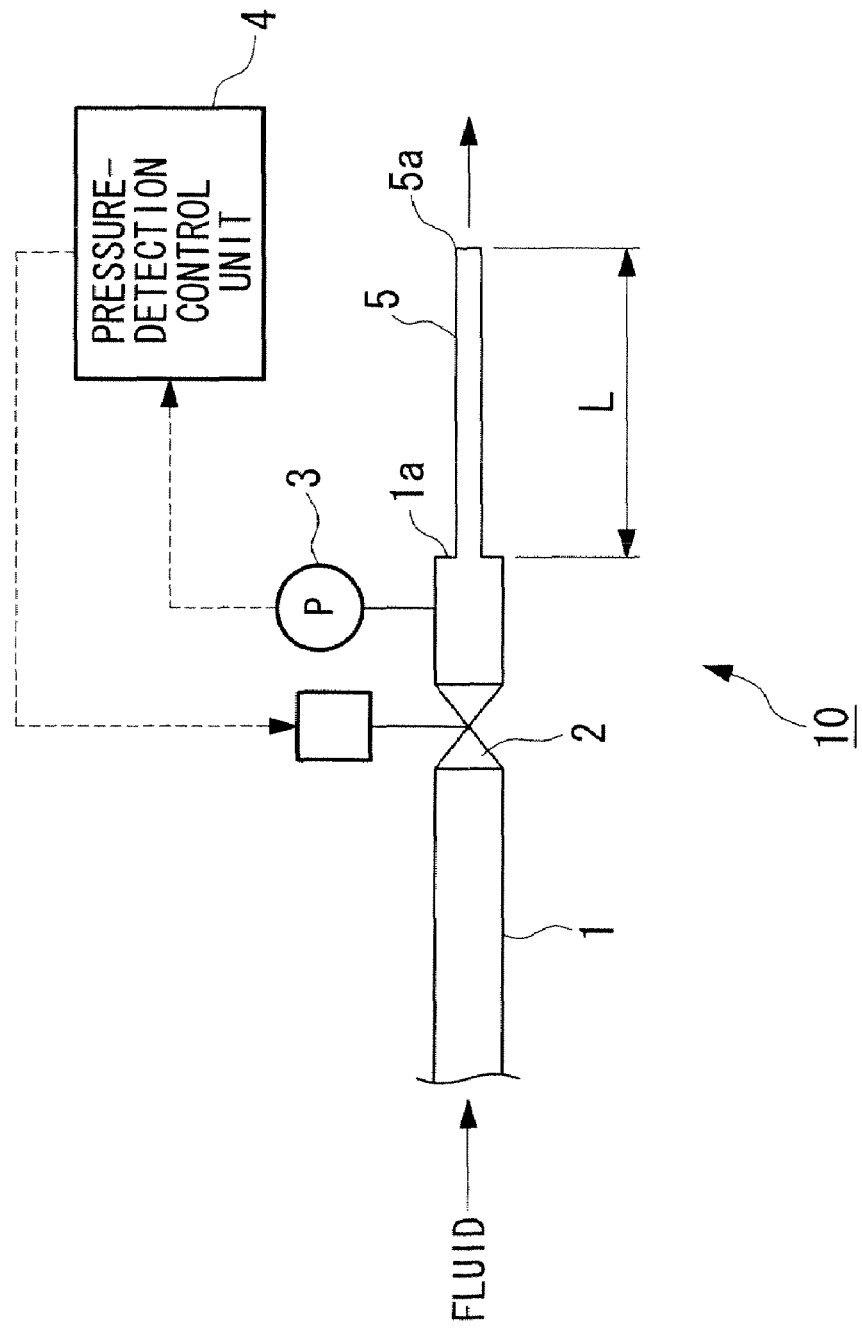
FIG. 1 is a diagram showing the configuration of a flow meter according to an embodiment of the present invention.

FIG. 1 is a diagram showing the configuration of the flow meter according to this embodiment. This flow meter 10 measures a minute flow rate of a fluid flowing through a fluid channel 1 having an outlet open to the atmosphere. Near an end section 1a on the outlet side of the fluid channel 1, a flow-rate control valve 2 for controlling the flow rate of a fluid by adjusting the degree of opening and a pressure sensor 3 that is pressure detection part for detecting the pressure of the fluid are provided. The fluid pressure detected by the pressure sensor 3 is input to a pressure-detection control unit (hereinafter referred to as a "control unit") 4 that is pressure/flow-rate conversion part. Here, the pressure sensor 3 to be employed is not limited, so long as it is capable of detecting the fluid pressure; however, for example, a piezoelectric pressure sensor or a capacitance pressure sensor is preferable.

The control unit 4 calculates the flow rate of the fluid according to values detected by the pressure sensor 3 and outputs a degree-of-opening control signal to the flow-rate control valve 2 according to the difference between the calculated flow rate and a predetermined flow rate set in advance. In other words, if the flow-rate control valve 2 is an automatic control valve that can be remotely controlled, by combining it with the flow meter 10 according to the present invention, a minute-flow-rate control system for controlling the flow rate in accordance with the degree-of-opening control signal output by the control unit 4 can be configured.

Then, the end section 1a on the outlet side of the fluid channel 1 is connected to a flow-rate measurement conduit portion (hereinafter referred to as a "conduit portion") 5 that has a channel cross-sectional area smaller than that of the fluid channel 1, has an output open to the atmosphere, and has a predetermined length L. This conduit portion 5 has a function of generating a pressure difference by throttling the channel cross-sectional area. The pressure difference is determined by calculating the difference of the detected value of the pressure sensor 3 corresponding to the pressure at the upstream side (primary side) of the conduit portion 5 and the atmospheric pressure, which is a constant reference value because the conduit portion 5 is open to the atmosphere.

At the flow meter 10 having the above-described structure, the flow rate changes according to the degree of opening of the flow-rate control valve 2, and the pressure of the flow decreases due to a pressure drop caused by throttling of the conduit portion 5 having a predetermined length L and a relatively large pressure drop caused by the fluid flowing through an inner diameter d for a predetermined length L, which is smaller than the channel cross-sectional area of the fluid channel 1, thus causing the outlet pressure to be balanced by the atmospheric pressure. Consequently, at the control unit 4, the flow rate of the fluid flowing through the fluid channel 1 and the conduit portion 5 can be calculated from the correlation between the pressure difference and the flow rate, stored in advance, on the basis of the pressure difference generated between the fluid pressure detected at the upstream side of the pressure sensor 3 and the atmospheric pressure at the downstream side. In consideration of various conditions, such as the measurement range of the flow rate, the inner diameter d of the conduit portion 5 may be set such that the flow of the fluid becomes laminar.

Since the conduit portion 5 has a channel with a predetermined length L serving as a rectifying section, the turbulence in the fluid flowing through this section caused by a decrease in the channel cross-sectional area due to throttling of the conduit portion 5 compared to the fluid channel 1 can be eliminated. Since throttling of the conduit portion 5 differs from the throttling of an orifice according to the related art, and the cross-sectional area of the channel on the downstream side does not change up to the outlet open to the atmosphere, or in other words, since the cross-sectional area does not rapidly increases as on the downstream side of the orifice, the generation of bubbles caused by cavitation can be prevented or suppressed. Even when a relatively small amount of bubbles are generated due to throttling, the amount of bubbles is reduced by the rectifying section. Moreover, the bubbles do not accumulate in the rectifying section and are dispersed into the atmosphere by flowing out from the outlet open to the atmosphere.

An outlet 5a of the conduit portion 5 is not limited to being positioned horizontally to the point (pressure measurement point) where pressure detection is carried out by the pressure sensor 3; however, to stabilize the measurement value of the flow rate measurement even move, it is preferable to position the outlet 5a diagonally to the flow direction such that the outlet 5a is higher than the pressure measurement point, or for example, such that the right side of the drawing is higher.

Since a back-pressure equal to the sum of the pressure drop generated by the fluid flowing to the outlet 5a and the head pressure caused by a difference in the pressure acts upon the pressure measurement point, by positioning the outlet 5a higher, the force of pushing out the liquid and the force of the back-pressure act in opposite directions to each other. Thus, it becomes possible to appropriately adjust the balance and control the flow rate in a stable manner.

Usually, by adjusting the degree of opening of the valve, the pressure cannot be lowered below atmospheric pressure. Therefore, if the position of the outlet 5a is set lower than the pressure measurement point, control cannot be carried out at the minute flow rate area (more specifically, pressure drop at the conduit portion<head pressure difference), and thus, the flow rate tends to become unstable.

In this way, since the flow meter is provided with the conduit portion 5 that forms a pressure difference, the secondary-side (downstream-side) pressure used for calculating the pressure difference does not have to be measured. Therefore, the number of pressure sensors 3 can be reduced to one, compared to the two required in the related art, enabling the cost to be reduced. Moreover, the pressure at the secondary-side, where the generation of bubbles causes a problem, does not have to be measured since the atmospheric pressure, which is a constant pressure, can be used. Thus, there is no change in the pressure value caused by bubbles, and accurate measurement of the flow rate, with fewer errors, becomes possible.

Therefore, even when the flow rate of the fluid is minute, accurate measurement of the flow rate, with fewer errors, becomes possible; an extremely minute flow rate of the fluid on the order of, for example, 1 ml/min can be measured within an error range of ±10%.

To accurately measure a minute flow rate on the order of, for example, 1 ml/min in a laminar flow, it is preferable to set the above-described conduit portion 5 such that the predetermined conduit length L is about 50 cm to 3 m and the inner diameter d is 2 mm or smaller. A more preferable inner diameter d for accurate flow-rate measurement is 1 mm or smaller, and the most preferable inner diameter d for accurate flow-rate measurement is 0.5 mm or smaller.

As a material of the flow-rate measurement conduit portion, a metal pipe or a plastic pipe may be employed. However, it is more preferable to employ an engineering plastic, namely, a thermoplastic resin called PEEK. Since this PEEK has excellent mechanical strength, heat resistance, and chemical resistance, a change in the inner diameter d caused by thermal deformation, which may cause an error in measurement, can be prevented.

Figure 2:
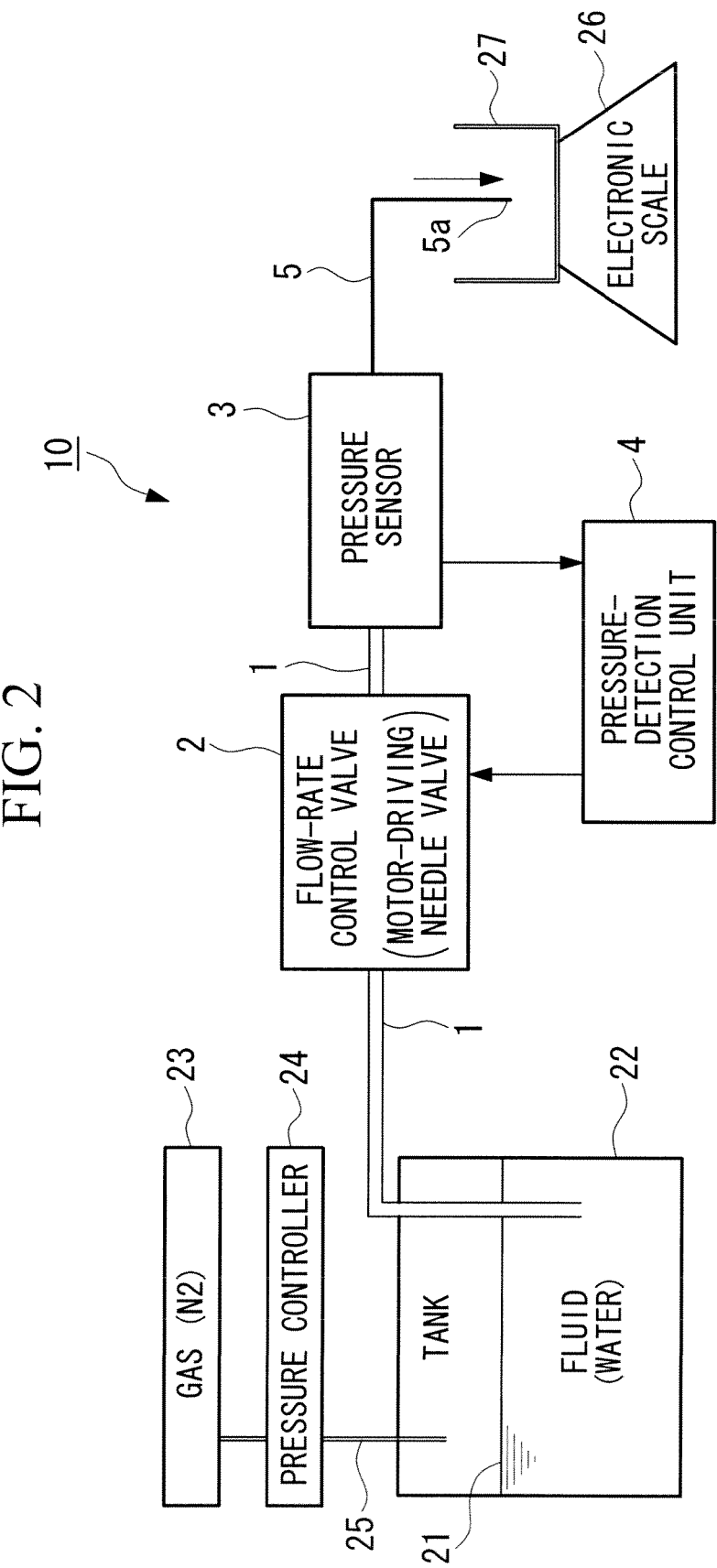
FIG. 2 is a diagram showing the configuration of an experimental apparatus of the flow meter according to the present invention.
Figure 3:
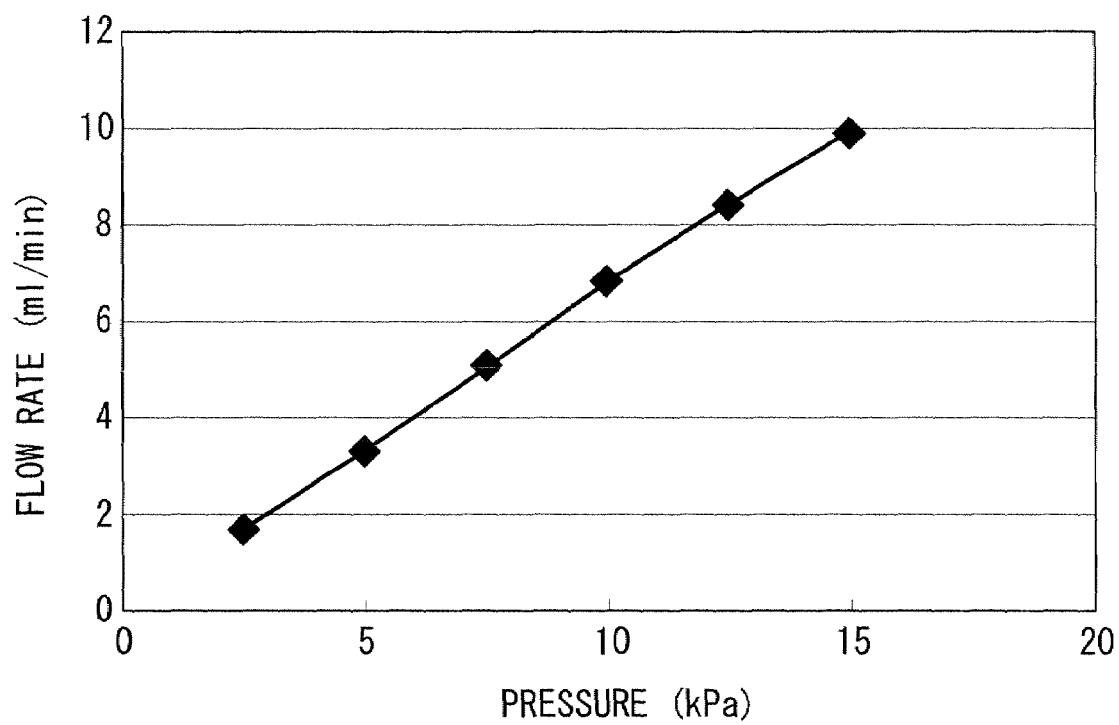
FIG. 3 is a graph illustrating the results of an experiment obtained by the experimental apparatus shown in FIG. 2.

Here, in association with the above-described flow meter 10 according to the present invention, the experimental results of the relationship between the pressure detection value of the pressure sensor 3 and the actual flow rate, obtained by the experimental apparatus having the structure shown in FIG. 2, are shown in FIG. 3. For the experimental apparatus shown in FIG. 2, the components that are the same as those in the above-described flow meter 10 are represented by the same reference numerals.

In this experiment, water is used as a fluid 21 flowing through the fluid channel 1. A method in which this fluid (water) is stored in a sealed tank 22, pressurized from the fluid surface by a gas (nitrogen gas $N_2$) 23, and pushed out to the fluid channel 1 whose end section opens into the fluid is used. The gas 23 for pressurization is stored in a pressure container, adjusted to a predetermined pressure via a pressure controller 24, and then, supplied to the tank 22 via a gas channel 25. As the flow-rate control valve 2, a motor-driven needle valve is used.

On the other hand, for the flow rate of the fluid flowing out from the conduit portion 5 of the flow meter 10, the fluid is received by a container 27 that has an open upper section and is disposed on an electronic scale 26 so as to measure the change in weight and calculate the volume. Since the fluid is water, the flow rate per unit time is determined by calculating the change in volume such that 1 g equals 1 ml.

Here, various experimental conditions are shown below.

1) fluid: water
2) water temperature: 23° C.
3) ambient temperature: 21° C.
4) primary pressure (pressure on upstream side of the flow-rate control valve 2): 100 kPa
5) fluid channel pipe (primary-side pipe): ¼ inches (pipe name)
6) flow-rate measurement conduit portion (secondary-side pipe) material: PTFE
7) flow-rate measurement conduit portion (secondary-side pipe) diameter: 3Φ (outer diameter)/0.5Φ ((inner diameter)
8) flow-rate measurement conduit portion (secondary-side pipe) length: 3 m
9) pressure when flow-rate control valve is closed: 0.75 kPa
(when the outlet 5a of the flow-rate measurement conduit portion 5 is bent downward, and the fluid used remains inside the conduit portion)

An experiment was conducted according to the following procedure with the above-described experimental apparatus and conditions.

In preparation for the experiment, the tank 22 was filled with a predetermined amount of the fluid (water) 21, sealed, and connected to the gas ($N_2$) supply system of the 23. At this time, the flow-rate control valve 2 was fully closed. In this state, the pressure controller 24 was operated to supply the gas 23 of a predetermined pressure to the tank 22 and to pressurize the inside of the tank 22.

Next, by opening the flow-rate control valve 2, the fluid 21 pressurized by the gas 23 flows through the fluid channel 1 and the flow-rate control valve 2. At this time, the detected value of the pressure sensor 3 is set to a predetermined pressure, and the pressure-detection control unit 4 that receives the input of the pressure detection value controls the degree of opening of the flow-rate control valve 2. In this way, after the pressure settles to a predetermined value, the flow rate is calculated on the basis of the results of measuring the weight change of the fluid 21 flowing into the container 27 with the electronic scale 26.

The experimental results obtained by sequentially changing the set pressure in this way are shown in FIG. 3. In the flow-rate range (2 to 10 ml/min) in this case, it is clear from by the calculated Reynolds number that the flow inside the conduit portion 5 is laminar. Here, the pressure (horizontal axis) is the increasing pressure based on (0 point) the pressure (−0.75 kPa) when the above-described flow-rate control valve 2 is closed and is plotted against the flow rate as the set pressure is changed by 2.5 kPa.

According to the experimental results, since the relationship between the pressure and flow rate is represented by a straight line sloping upward in the right direction, by detecting the pressure at the pressure sensor 3, the flow rate can be easily calculated from the straight line obtained from the experimental results. In other words, by determining a characteristic such as that shown in FIG. 3 by carrying out the above-described experiment and storing this characteristic in the pressure-detection control unit 4 in advance, the flow rate of a fluid can be accurately calculated from the measurement values of the pressure sensor 3. The flow-rate control valve 2 is essential for configuring a flow-rate control system. However, when only the flow meter function is required, a manual on/off valve may be employed or the flow-rate control valve 2 may be omitted.

Since the above-described flow meter 10 has high accuracy for measuring a minute flow rate and is capable of minimizing the generation of bubbles, it is particularly suitable for controlling the flow rate of a chemical solution in a cleaning line of a semiconductor production apparatus when mixing the chemical having a minute flow rate into pure water. When the flow meter 10 is used in the cleaning line of a semiconductor production apparatus, the fluid flowing through the fluid channel 1 is the chemical to be mixed with pure water. Specific examples of the chemical include, for example, sulfuric acid, hydrofluoric acid (fluorinated acid), or a hydrogen peroxide solution. A cleaning solution obtained by mixing each of these chemicals flowing at a predetermined minute flow rate with pure water is poured on a wafer to carry out cleaning.

In such a case, the cleaning solution main line through which pure water flows is the outlet environment of the fluid (chemical). This outlet environment is maintained at a predetermined constant pressure. Thus, since the flow of the pure water to which the conduit portion 5 is connected and the chemical is injected is a flow having a predetermined constant pressure, similar to the above-described case in which the outlet is open to the atmosphere, flow-rate measurement can be carried out with merely one pressure sensor 3. In other words, the pressure difference may be calculated from the difference between the detected value of the pressure sensor 3 and the predetermined pressure, or, to calculate the pressure difference even more accurately, similar to the above-described experiment, the pressure difference may be calculated from the detected value of the pressure sensor 3 with reference to the pressure when the flow-rate control valve 2 is fully closed.

In this way, by employing the flow meter 10 according to the present invention in a wafer cleaning line of a semiconductor production apparatus, not only can chemical injection be accurately controlled at a minute flow rate, but also the generation of bubbles and outflow of accumulated bubbles are almost eliminated. Therefore, negative effects on the products caused by pouring a cleaning solution including bubbles onto the wafer can be prevented or suppressed. Accordingly, with the semiconductor production apparatus, the number of defective products being produced can be decreased and yield can be improved.

As described above, the flow meter 10 according to the present invention throttles the channel cross-sectional area by passing fluid through the flow-rate measurement conduit portion 5 having a predetermined length L, generating a pressure difference with the pressure value detected at the pressure sensor 3, and calculates the flow rate on the basis of this pressure difference. Therefore, the flow-rate of a fluid flowing at a minute flow rate in a laminar flow can be measured highly accurately. Moreover, since the flow-rate measurement conduit portion 5 includes a rectifying section having a predetermined length L, not only can the generation of bubbles be suppressed, but also the small amount of bubbles generated do not flow out in clusters after accumulation.

Since the above-described flow meter has high measurement accuracy for a minute flow rate and can minimize the generation of bubbles, it is particularly suitable for controlling the flow rate of a chemical in a cleaning line of a semiconductor production apparatus when mixing the chemical having a minute flow rate into pure water. For example, even when a fluid that gives off bubbles due to saturated vapor pressure, such as a hydrogen peroxide solution, is used for measuring the flow rate, the generation of bubbles caused by passing through the flow meter 10 is suppressed in the same manner as other fluids.

Since an increase in a pressure loss in the pipe channel, the flow meter, and so on requires high pressure to be applied to the primary side, an increase in the capacity (performance) of the pump and compressor and an improvement in the channel and component specifications, such as pressure resistance and sealing performance, are required; as a result, the cost increases. Therefore, usually, it is ideal to use a flow meter without a pressure drop. However, the above-described flow meter 10 according to the present invention is based on the assumption that is used near a point-of-use (in a state in which the outlet is open to the atmosphere or the outlet pressure is sufficiently low), pressure drop is not a problem, and the measurement level of the pressure value at a minute flow rate can be increased by actively, thus generating a pressure drop by throttling the channel cross-sectional area from the fluid channel 1 to the conduit portion 5, thus enabling highly accurate measurement.

Second Embodiment

An embodiment of a flow-rate control system according to the present invention will be described below with reference to the drawings.

Figure 4:
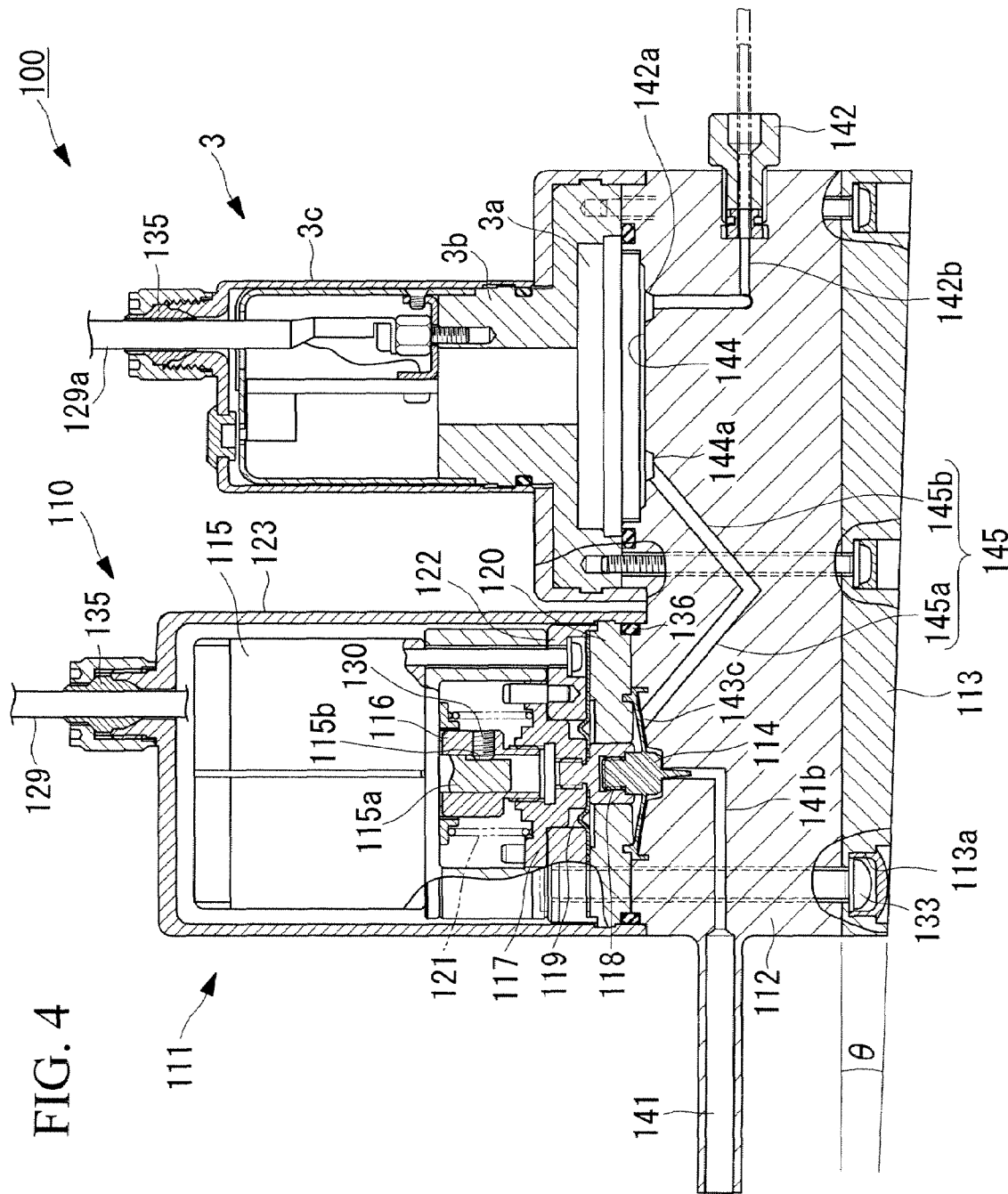
FIG. 4 is a longitudinal cross-sectional view of a flow-rate control system according to a second embodiment of the present invention.

As shown in FIG. 4, a flow-rate control system 100 according to this embodiment is characterized in that, in the flow meter 10 according to the first embodiment, a flow-rate control valve 110 is used instead of the flow-rate control valve 2, and this flow-rate control valve 110 and the flow meter 10 are provided on a surface (upper surface in this embodiment) of a block-shaped body 112 having a fluid channel 101 inside.

Hereinafter, components that are similar to or the same as those in the flow meter 10 according to the first embodiment are assigned the same reference numerals, and descriptions thereof are omitted.

The flow-rate control valve 110 is constituted mainly of a driving unit 111, the body 112, a base 113 (pedestal), and a diaphragm needle (valve element) 114.

The driving unit 111 includes a motor 115, a coupling 116, a slider 117, a stopper 118, packing 119, a diaphragm cover 120, a spring (urging member) 121, a cover flange 122, and a cover 123.

The motor 115, for example, comprises a stepping motor. At the center portion of the lower surface of this motor 115, a rotary shaft 115a that protrudes downward and rotates forward and backward by electrical power supplied via a cable 129 is provided. A flat seating surface 115b is provided on part of the rotary shaft 115a. This seating surface 115b contacts the end surface of a hexagon-socket set screw 130, which is described below.

Figure 5:
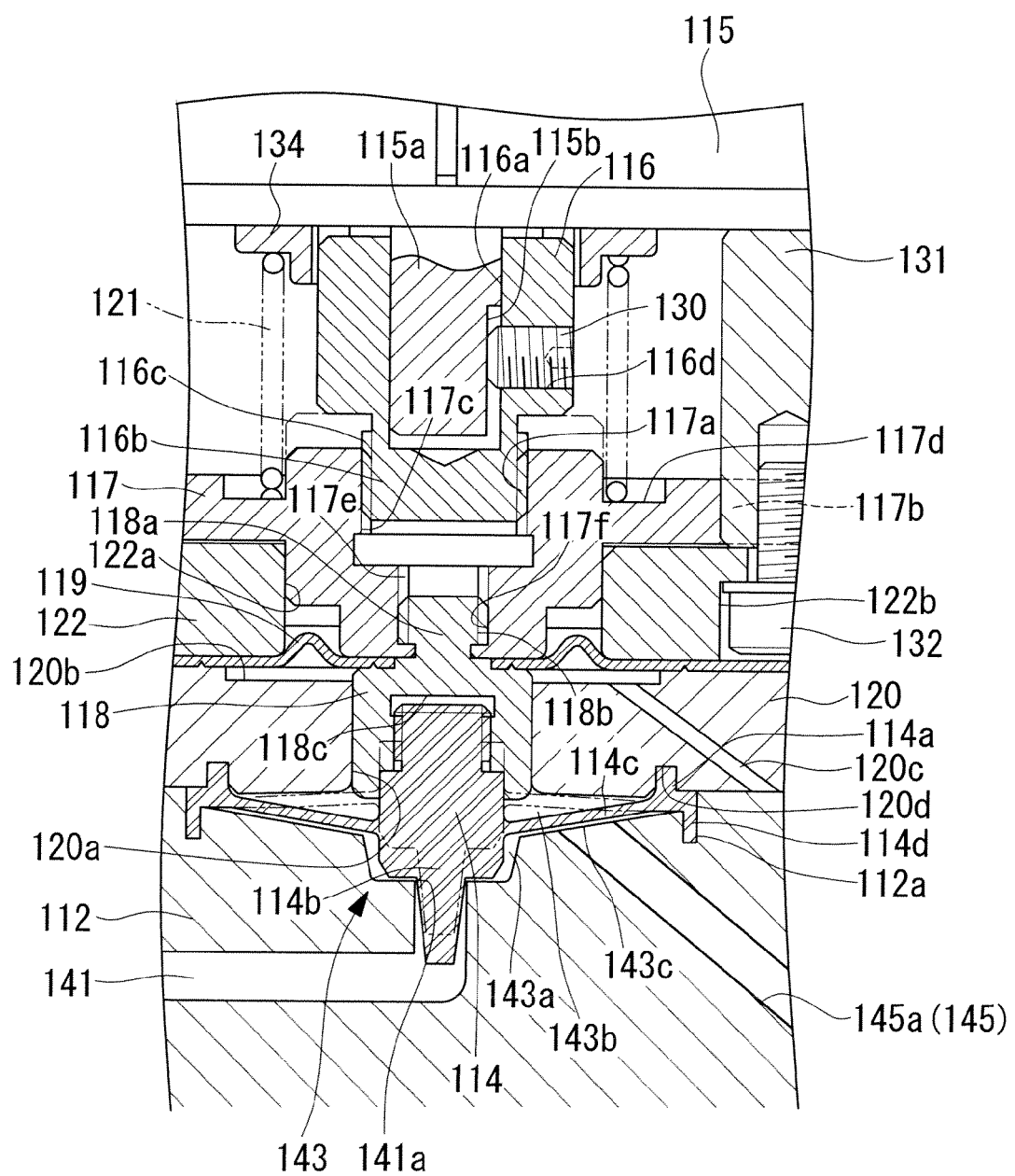
FIG. 5 is an enlarged view of the main section of FIG. 4.

As shown in FIG. 5, the coupling 116 is a cylindrical member having a substantially T-shaped cross-section. Its center portion is provided with a depression 116a for receiving the rotary shaft 115a, and a protrusion 116b protrudes downward from the lower end portion. A male threaded portion 116c is formed on the outer surface of the protrusion 116b and engages with a female threaded portion 117a, described below, of the slider 117.

On the sidewall constituting the depression 116a of the coupling 116, a through-hole 116d for receiving the hexagon-socket set screw 130 is formed. On the surface of this through-hole 116d, a female threaded portion that engages with the male threaded portion formed on the surface of the hexagon-socket set screw 130 is provided. The hexagon-socket set screw 130 is screwed into the through-hole 116d so that the male threaded portion of the hexagon-socket set screw 130 engages with the female threaded portion of the through-hole 116d and the end surface of the hexagon-socket set screw 130 contacts the seating surface 115b of the rotary shaft 115a. In this way, the coupling 116 is fixed to the rotary shaft 115a.

The slider 117 moves up and down along a motor shaft 131 that extends downward from the bottom surface of the motor 115. On both end sections (right and left end sections in the drawing) 117b of the slider 117, branching portions (not shown) having an inner circumferential surface contacting the outer circumferential surface of the motor shaft 131 are provided.

At the upper center portion of the slider 117, a first depression 117c for receiving the protrusion 116b of the coupling 116 is provided.

The female threaded portion 117a that engages with the male threaded portion 116c of the protrusion 116b is provided on the surface of the first depression 117c. A groove 117d shaped as a ring in plan view is formed outside of the female threaded portion 117a in the radial direction around the periphery. An end surface (lower end surface in the drawing) of the spring 121 is held in this groove 117d.

At the lower center portion of the slider 117, a second depression 117e for receiving a protrusion 118a of the stopper 118 is provided. A female threaded portion 117f that engages with a male threaded portion 118b of the protrusion 118a is provided on the surface of the second depression 117e.

The slider 117 having the above-described structure moves up and down along the motor shaft 131 by means of the coupling 116, which rotates together with the rotary shaft 115a of the motor 115.

The motor shaft 131 is fixed to the cover flange 122 with a screw 132.

The stopper 118 is a cylindrical member having a substantially T-shaped cross-section. Its center portion is provided with a depression 118c for receiving the center portion of the diaphragm needle 114, and the protrusion 118a protrudes upward from the upper end portion of the stopper 118. The male threaded portion 118b that engages with the female threaded portion 117f of the slider 117 is provided on the outer surface of the protrusion 118a.

In other words, the stopper 118 is fixed to the slider 117 by screwing the protrusion 118a into the second depression 117e of the slider 117 and moves up and down together with the slider 117.

When the protrusion 118a of the stopper 118 is screwed into the second depression 117e of the slider 117, the inner circumferential edge of the packing 119 is gripped between the stopper 118 and the slider 117.

The packing 119 is a donut-shaped member in plan view, and a hole through which the protrusion 118a of the stopper 118 passes is provided at the center portion. The packing 119 is formed of, for example, fluororubber (FKM). The inner circumferential edge of this packing 119 is interposed between the stopper 118 and the slider 117 and is fixed by its outer circumferential edge being interposed between the diaphragm cover 120 and the cover flange 122.

The diaphragm cover 120 and the cover flange 122 are fixed to the body 112 and the base 113 with a pan-head machine screw 133 (see FIG. 4).

The diaphragm cover 120 has a through-hole 120a that guides the outer circumferential surface of the sidewall forming the depression 118c of the stopper 118 at the center portion, a depressed portion 120b at the center portion of the upper surface, and a communication channel 120c that connects the upper surface and the lower surface.

A groove 120d that accommodates a ring-shaped protrusion 114a formed upward from the outer circumferential edge of the diaphragm needle 114 is provided on the lower surface of the diaphragm cover 120.

The spring 121 is a compression coil spring that is interposed between a spring bearing 134 provided on the bottom surface of the motor 115 and the groove 117d of the slider 117 and that constantly urges the slider 117 downward (toward the cover flange 122). The spring 121 reduces (or eliminates) backlash between the female threaded portion 117a of the slider 117 and the male threaded portion 116c of the coupling 116.

The cover flange 122 includes, at the center portion thereof, a through-hole 122a that guides the outer circumferential surface of the sidewall forming the depression 117c of the slider 117. The lower surface of the cover flange 122 and the upper surface of the diaphragm cover 120 sandwich the outer circumferential edge of the packing 119. At the bottom end of the cover flange 122, a depressed portion 122b for accommodating the head of the screw 132 is provided.

As shown in FIG. 4, the cover 123 is disposed in contact with the upper area of the body 112 and accommodates the driving unit 111, described above. Cable packing 135 is provided between the cover 123 and the cable 129, and an O-ring 136 is provided between the cover 123, and the body 112 and the diaphragm cover 120. The cable packing 135 and the O-ring 136 are formed of, for example, fluororubber (FKM).

The body 112 is shaped as a substantially cubic block and is formed of, for example, a fluorine resin material, such as PTFE (polytetrafluoroethylene), PCTFE (polychlorotrifluoroethylene), PFA (a copolymer of tetrafluoroethylene perfluoroalkoxy vinyl ether).

A fluid inlet 141 is provided on one side of the body 112 (left side in the drawing). A fluid outlet 142 is provided on the other side positioned on the opposite of the fluid inlet 141 (right side in the drawing).

As shown in FIGS. 4 and 5, a port 143 that is connected to the fluid inlet 141 is provided on one side of the upper surface of the body 112, and a port 144 that is connected to the fluid outlet 142 is provided on the other side. These ports 143 and 144 are connected via a connecting channel 145 provided inside the body 112.

The port 143 includes a needle storing portion 143a that receives a needle portion 114b of the diaphragm needle 114 when the diaphragm needle 114 is in the closed state (a state represented by the solid lines in the drawings) and a diaphragm storing portion 143b that contacts the lower surface of a diaphragm portion 114c of the diaphragm needle 114 when the diaphragm needle 114 is closed.

The needle storing portion 143a is formed of a depressed portion having a circular shape in plan view. The bottom surface of the needle storing portion 143a is a horizontal surface, and a fluid inlet 141a that connects to the fluid inlet 141 is provided on the center portion of the bottom surface. In this embodiment, the fluid inlet 141 and the port 143 are connected by a first channel 141b that includes a horizontal portion extending substantially horizontally from the fluid inlet 141 to directly below the fluid inlet 141a and a vertical portion extending substantially vertically upward from the horizontal portion.

The diaphragm storing portion 143b is a cone-shaped space shaped like a donut in plan view, is formed outside of the needle storing portion 143a in the radial direction, above the bottom surface of the needle storing portion 143a, and is formed such that the depth gradually decreases from the inside to the outside in the radial direction. A fluid outlet 143c connected to the connecting channel 145 is provided on the diaphragm storing portion 143b.

The upper surface of the body 112 is provided with a depressed groove 112a for accommodating a ring-shaped protrusion 114d protruding downward from the outer circumferential edge of the diaphragm needle 114.

The port 144 is formed of a depressed portion that is open at the upper surface of the body 112. A fluid inlet 144a connected to the connecting channel 145 is provided on the bottom surface of the port 144 on one side of the body 112, and a fluid outlet 142a connected to the fluid outlet 142 is provided on the other side. In this embodiment, the port 144 and the fluid outlet 142 are connected by a second channel 142b that includes a vertical portion extending substantially vertically downward from the fluid outlet 142a and a horizontal portion extending substantially horizontally from lower edge of the vertical portion to the fluid outlet 142.

The port 144 internally receives a sensor body 3a of the pressure sensor 3, and forms part of the fluid channel 1 to the sensor body 3a. In other words, in this embodiment, the pressure sensor 3 is configured to measure fluid pressure in the area between the port 144 and the sensor body 3a.

A sensor holder 3b that covers the sensor body 3a stored in the port 144 is attached on the upper surface of the body 112.

The lower portion of the sensor holder 3b is disk-shaped and covers, in an airtight, liquid-tight manner, the peripheral portion of the port 144 on the upper surface of the body 112.

Here, a signal line of the sensor body 3a is led out to the upper-surface side of the sensor holder 3b through the sensor holder 3b and is connected to a cable 129a connected to the pressure-detection control unit 4.

A protection cover 3c for covering the portion connecting the signal line of the sensor body 3a and the cable 129a is provided on the upper portion of the sensor holder 3b.

The connecting channel 145 connecting the ports 143 and 144 includes a first inclined channel 145a that is gradually inclined toward the port 144, from the fluid outlet 143c of the port 143 to the inside of the body (lower-surface side), and a second inclined channel 145b that is gradually inclined toward the port 143, from the fluid inlet 144a of the port 144 to the lower surface of the body 112, and connected to the lower edge of the port 144.

On another side of the body 112 (the surface farthest from the plane of the drawing sheet), a discharge outlet, not shown in the drawing, is provided, and a discharge channel (not shown) connecting to the communication channel 120c formed on the diaphragm cover 120 is provided on another side of the body 112. A duckbill valve is disposed inside the discharge channel. This duckbill valve is a so-called check valve formed of, for example, fluororubber (FKM).

The base 113 is a plate-like member disposed in contact with the lower surface of the body 112. A depressed portion 113a for accommodating the head of the pan-head machine screw 133 is provided on the lower edge of the base 113.

The body 112 is securely disposed on the upper surface of the base 113.

This upper surface is an inclined surface that is gradually inclined upward from one side of the body 112 to another side (in other words, from the inlet side of the fluid channel in the body 112 to the outlet side).

With the flow-rate control system 100 having the structure according to this embodiment, the flow-rate control valve 110 and the pressure sensor 3 share the same body 112. In other words, in the flow-rate control system 100, since the flow-rate control valve 110 and the pressure sensor 3 are integrated, their ease of handling is improved.

The flow-rate control valve 110 and the pressure sensor 3 are provided on the upper surface side of the body 112 and are connected by the fluid channel provided inside the body 112.

In the fluid channel inside the body 112, the section (connecting channel 145) that connects the flow-rate control valve 110 and the pressure sensor 3 is formed of the first inclined channel 145a and the second inclined channel 145b that are provided diagonally to a surface of the body 112 and is substantially V-shaped.

In other words, in the fluid channel inside the body 112, the section connecting the flow-rate control valve 110 and the pressure sensor 3 is formed of two inclined holes formed on the upper surface side of the body 112. The shape of the fluid channel is simple, and thus the fluid inside the fluid channel is less likely to accumulate.

In this way, in the fluid channel inside the body 112, since the section connecting the flow-rate control valve 110 and the pressure sensor 3 is formed by providing two inclined holes, the holes do not have to be backfilled. Thus, a minimum amount of processing of the body 112 is required, and production is simplified.

In this flow-rate control system 100, the upper surface on which the body 112 of the base 113 is disposed is an inclined surface gradually inclining upwards from the inlet side of the fluid channel to the outlet side of the fluid channel.

In this way, at the horizontal portion of the first channel 141b and the horizontal portion of the second channel 142b forming the fluid channel inside the body 112 disposed on the base 113, the position of the outlet side becomes higher than the position of the inlet side. Thus, the height difference of the inlet side and the outlet side of the first inclined channel 145a becomes small.

Therefore, bubbles generated inside the horizontal portions of the first and second channels 141b and 142b or bubbles that flow into these horizontal portions easily move toward the outlet side of the fluid channel because the buoyancy of the bubbles acts toward the outlet side of the fluid channel, and bubbles are less likely to accumulate.

In the fluid channel inside the body 112 the difference in height of the inlet side and the outlet side becomes small at the first inclined channel 145a, which is higher, thus causing the bubbles circulating in the fluid channel to easily move to the outlet side and making the bubbles less likely to accumulate inside the fluid channel.

Therefore, even when the flow rate of the fluid flowing inside the fluid channel is very small, the bubbles easily move to the outlet side of the fluid channel, and the bubbles are less likely to accumulate inside the fluid channel The inclination angle θ of the upper surface of the base 113 relative to the horizontal surface can be set to any angle equal to or smaller than 90°. As this inclination angle θ is increased, the discharge effect of the bubbles becomes greater.

Here, instead of forming the upper surface of the base 113 as an inclined surface, as in this embodiment, the same effect can be achieved by designing each part of the fluid channel inside the body 112 to limit the height difference between the outlet side and the inlet side in sections where the outlet side is set higher than the inlet side or where the outlet side is designed to be lower than the inlet side.

With the flow-rate control system 100 having the structure according to this embodiment, when the user operates the motor 115 of the flow-rate control valve 110 to rotate the rotary shaft 115a of the motor 115 in one direction (for example, clockwise when viewing FIG. 4 from above), the coupling 116 rotates in this direction together with the rotary shaft 115a.

As the coupling 116 rotates, the slider 117 connected by the male threaded portion 116c of the coupling 116 and the female threaded portion 117a of the slider 117 moves upward (ascends) along the motor shaft 131. As the slider 117 ascends, the needle portion 114b and the diaphragm portion 114c of the diaphragm needle 114 connected to the slider 117 by the stopper 118 ascends together to enter a fully open state (a state represented by the double-dotted lines in FIG. 5). When the needle portion 114b ascends, a gap is formed between the fluid inlet 141a and the needle portion 114b, and the valve enters an open state (the valve opens) so that the fluid flows into the port 143, and the fluid that fills the port 143 continuously flows toward the fluid outlet 142 through the fluid outlet 143c.

To decrease the flow rate of the fluid or to close the valve, the motor 115 is operated to rotate the rotary shaft 115a of the motor 115 in the other direction (for example, counterclockwise when viewing FIG. 4 from above).

With the flow-rate control valve 110 having the structure according to this embodiment, since the slider 117 is constantly urged downward (in the closing direction of the needle portion 114b of the diaphragm needle 114) by the spring 121, and backlash between the female threaded portion 117a of the slider 117 and the male threaded portion 116c of the coupling 116 is reduced (or eliminated), hysteresis in the flow rate can be prevented (or eliminated).

FIG. 7(a) is a graph illustrating the flow rate measured at each rotational angle of the rotary shaft 115a when the rotary shaft 115a is rotated by three turns in a direction for opening the flow-rate control valve 110 according to this embodiment from a closed state to a fully open state and then rotating the rotary shaft 115a in the direction for closing the flow-rate control valve 110. In the graph, the crosses represent the measurement values obtained from the closed state to the open state, whereas the triangles represent the measurement values obtained from the open state to the closed state.

FIG. 7(b) is graph illustrating the results of a measurement similar to that of FIG. 7(a) in which the measurement is carried out when a flow-rate control valve not including the spring 121 urging the slider 117 downward is rotated three turns in a direction for opening the flow-rate control valve from a closed state to a fully open state and then rotating the rotary shaft 115a in the direction for closing the flow-rate control valve. FIG. 7(b) is a graph illustrating the same measurements as those in FIG. 7(a). In the graph, the asterisks represent the measurement values obtained from the closed state to the open state, whereas the dots represent the measurement values obtained from the open state to the closed state.

In this way, with the flow-rate control valve 110 in which the spring 121 constantly urges the slider 117 downward, a difference in the flow rates when the valve is open and closed or, in other words, hysteresis in the flow rate, can be significantly reduced or almost eliminated.

Since the fluid outlet 143c is provided above the port 143 or, in other words, above the fluid inlet 141a, bubbles generated inside the port 143 can be reduced or almost eliminated.

Since, on the outer circumferential edge of the diaphragm needle 114, the protrusion 114a is provided upward and the protrusion 114d is provided downward, and the protrusions 114a and 114d are tightly accommodated in the groove 120d of the diaphragm cover 120 and the depressed groove 112a of the body 112, respectively, circulation of a fluid (liquid) from the lower area to the higher area of the diaphragm needle 114 can be prevented.

Furthermore, since the packing 119 whose inner circumferential edge is interposed between the slider 117 and the stopper 118 and whose outer circumferential edge is interposed between the diaphragm cover 120 and the cover flange 122 is provided, one side (lower side in the drawing) of the packing 119 can be completely separated from the other side (upper side in the drawing) or, in other wards, the side of the diaphragm needle 114 can be completely separated from the side of the motor 115.

Accordingly, vaporized liquid (or gas) (for example, a hydrofluoric acid solution) can be reliably prevented from entering the space in which the motor 115 is accommodated.

Furthermore, since the communication channel 120c is provided on the body 112 to connect with the outside of the flow-rate control valve 110, gaseous fluid (gas of a vaporized solution of hydrofluoric acid, hydrochloric acid, or nitric acid) accumulated on one side of the packing 119 can be quickly discharged outside, and the movement of the diaphragm needle 114 can be prevented from being interrupted.

Moreover, the communication channel 120c functions as a ventilating port to smoothen the movement of the diaphragm needle 114.

Third Embodiment

Figure 6:
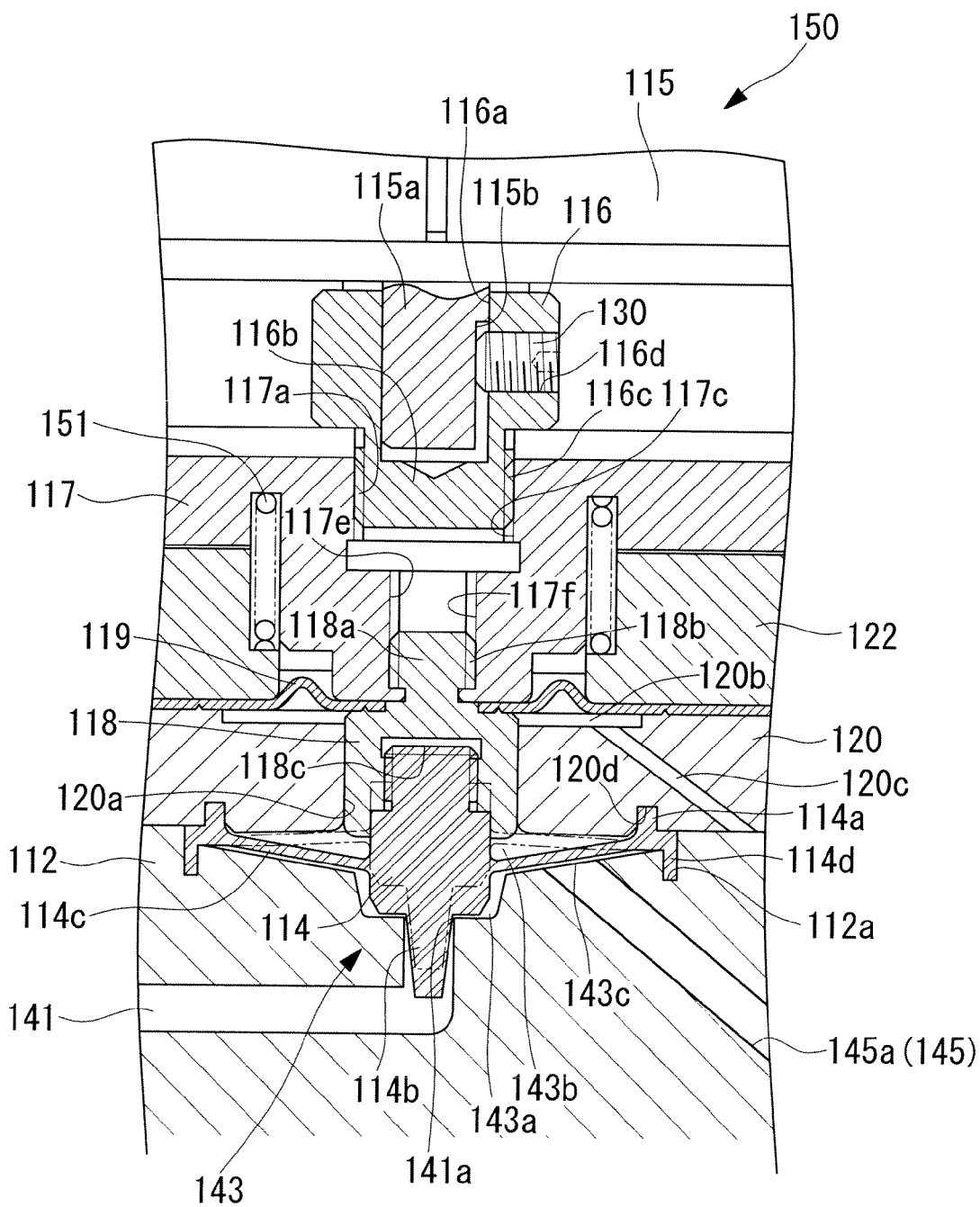
FIG. 6 illustrates a flow-rate control valve of a flow-rate control system according to a third embodiment of the present invention and is similar to FIG. 5.

Another embodiment of a flow-rate control system according to the present invention will be described with reference to FIG. 6.

The flow-rate control system according to this embodiment is mainly characterized in that in the flow-rate control system 100 according to the second embodiment, instead of the flow-rate control valve 110, a flow-rate control valve 150 is used. The flow-rate control valve 150 differs from that according to the second embodiment in that, instead of the spring 121, a spring 151 is provided. Since the other components are the same as those according to the above-described second embodiment, descriptions thereof are omitted.

The same members as this according to the above-described second embodiment are represented by the same numerals.

The spring 151 according to this embodiment is a compression coil spring interposed between the slider 117 and the cover flange 122 and constantly urges the slider 117 upward (toward the motor 115). In this way, backlash of the female threaded portion 117a of the slider 117 and the male threaded portion 116c is reduced (or eliminated).

With the flow-rate control valve 150 according to this embodiment having the above-described structure, since the direction of the force of the fluid passing through the port 143 acting upon the diaphragm needle 114 and the direction in which the spring 151 urges the slider 117 match, the change in the amount of backlash of the female threaded portion 117a and the male threaded portion 116c caused by the pressure difference of the fluid can be substantially eliminated. Therefore, the difference in flow rate due to opening and closing the valve or, in other words, hysteresis in the flow rate can be substantially eliminated.

Since other advantages are the same as those according to the above-described second embodiment, descriptions thereof are omitted.

In the above-described second and third embodiments, the rotary shaft 115a and the slider 117 are connected with the coupling 116. However, the present invention is not limited thereto, and the coupling 116 may be omitted by directly providing a male threaded portion on the outer surface of the rotary shaft 115a.

In this way, the distance between the motor 115 and the slider 117 can be decreased to shorten the longitudinal length (length in the vertical direction) of the flow-rate control valves 110 and 150, and the size of the valves can be reduced.

Fourth Embodiment

Figure 8:
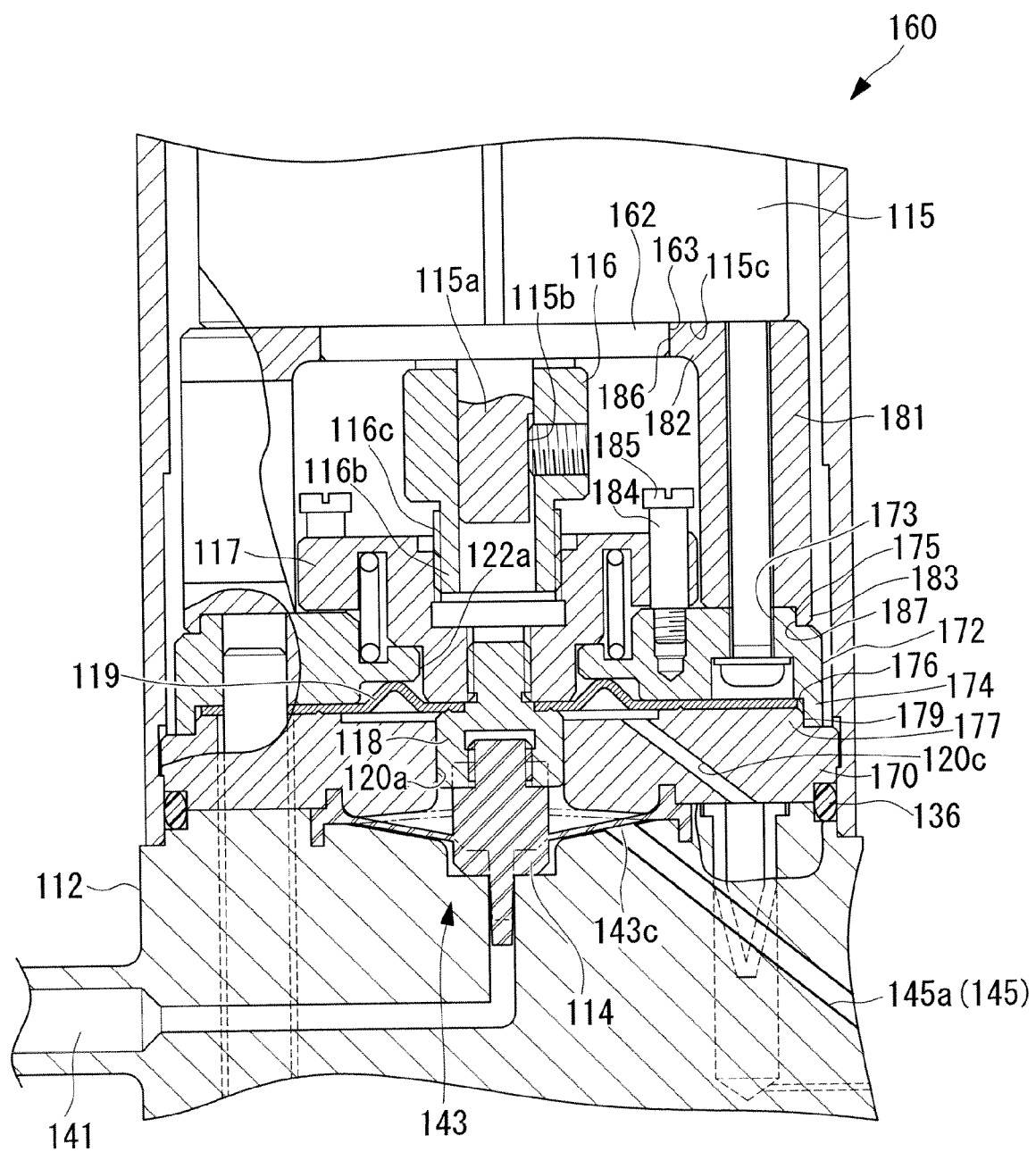
FIG. 8 is a longitudinal cross-sectional view of a flow-rate control valve of a flow-rate control system according to a fourth embodiment of the present invention.
Figure 9:
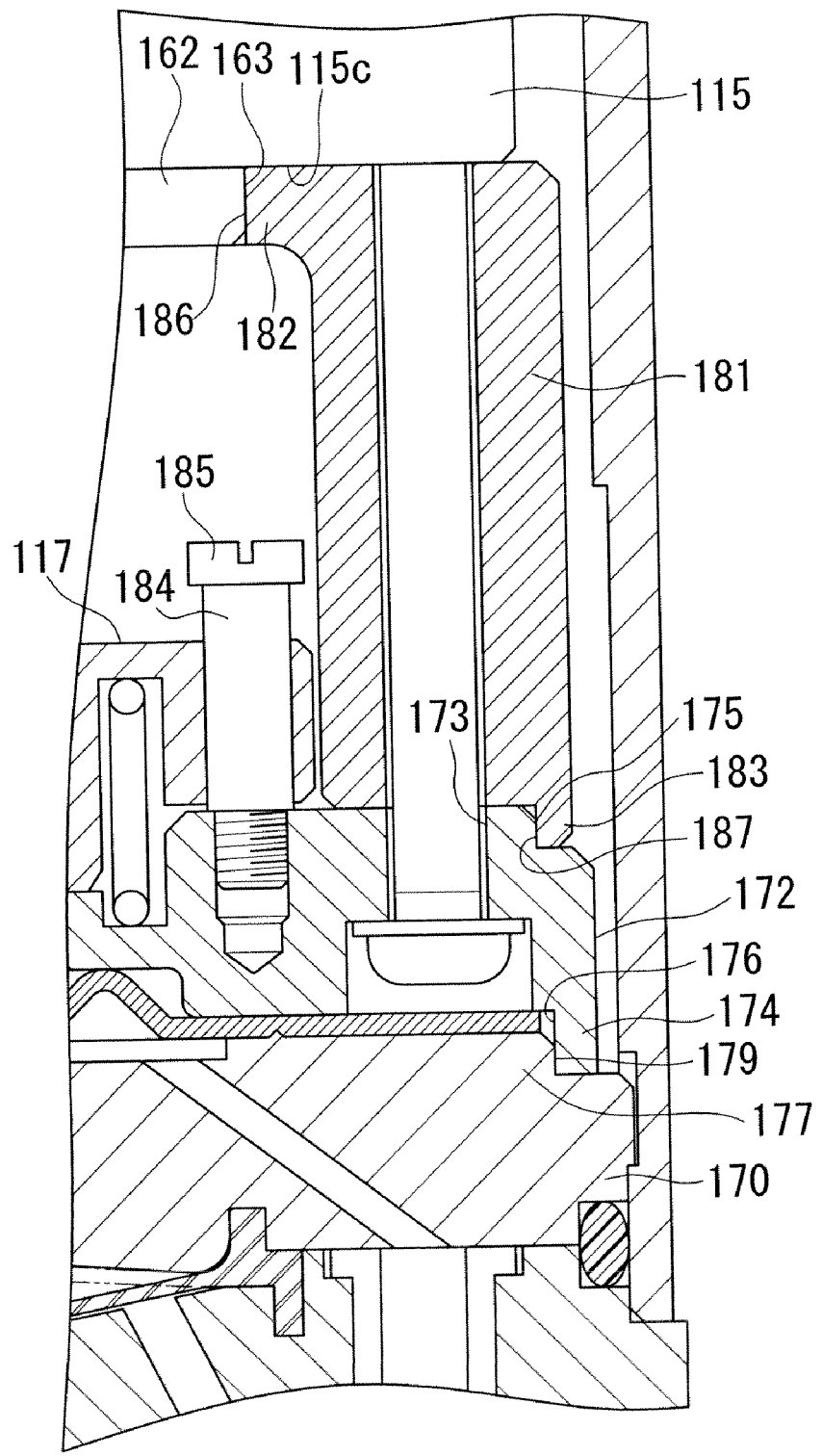
FIG. 9 is a partially enlarged view of FIG. 7.

Another embodiment of a flow-rate control system according to the present invention will be described with reference to FIGS. 8 and 9.

The flow-rate control system according to this embodiment is mainly characterized in that, in the flow-rate control system according to the third embodiment, a flow-rate control valve 160 is used instead of the flow-rate control valve 150 according to the third embodiment. The flow-rate control valve 160 is mainly characterized in that the attachment structure of the motor 115 to the body 112 is changed from that in the flow-rate control valve 150. Hereinafter, the same reference numerals are used to represent members that are the same as those of the flow-rate control valve 150 according to the third embodiment, and detailed descriptions thereof are omitted.

In the flow-rate control valve 160 according to this embodiment, instead of the diaphragm cover 120, the cover flange 122, and the motor shaft 131, a diaphragm cover 170, a cover flange 172, and a housing 181, having structures partially different from the diaphragm cover 120, the cover flange 122, and the motor shaft 131, are used as fixing members for fixing the motor 115 to the body 112

In this embodiment, a cylindrical portion 162 that is concentric with the rotary shaft 115*a* and that protrudes downward from a lower surface 115*c* is provided at the lower edge of the motor 115, and the outer circumferential surface of the cylindrical portion 162 comprises a first alignment reference surface 163.

The lower surface 115*c* of the motor 115 is a flat surface that is substantially orthogonal to the rotary shaft 115*a*.

The housing 181 is a substantially cylindrical member through which the rotary shaft 115*a* of the motor 115 is passed and allows the slider 117 to be vertical displaced inside.

The housing 181 is provided with an inner flange 182 in which the cylindrical portion 162 of the motor 115 is inserted. At the lower edge of the housing 181, a ring-shaped protrusion 183 protruding downward from the lower edge surface is provided. In this embodiment, the inner flange 182 and the protrusion 183 are concentric with the axis of the housing 181.

The inner circumferential surface of the inner flange 182 is shaped as a cylindrical inner surface that has an inner diameter substantially the same as the outer diameter of the cylindrical portion 162 of the motor 115. This inner circumferential surface comprises a first alignment surface 186 that receives the first alignment reference surface 163 of the motor 115 to concentrically align the motor 115 with the axis of the inner flange 182.

The inner circumferential surface of the protrusion 183 comprises a second alignment reference surface 187 that is shaped as a cylindrical inner surface concentric with the first alignment surface 186.

On the upper surface of the cover flange 172, a cylindrical portion 173 protruding upward is provided concentric with the through-hole 122*a*, and on the lower surface, a ring-shaped protrusion 174 protruding downward is provided.

The cylindrical portion 173 is inserted on the inner circumferential side of the protrusion 183 of the housing 181, and its outer circumferential surface comprises a cylindrical surface having a diameter substantially the same as the inner diameter of the protrusion 183 of the housing 181. This outer circumferential surface comprises a cylindrical second alignment surface 175 that receives the second alignment reference surface 187 of the housing 181 and aligns the housing 181 concentric with the through-hole 122*a*.

Here, the ring-shaped portion on the upper surface of the cover flange 172, located on the outer circumferential side of the cylindrical portion 173, is a flat surface that is substantially orthogonal to the through-hole 122*a*.

The inner circumferential surface of the protrusion 174 comprises a third alignment reference surface 176 that is shaped as a cylindrical inner surface that is concentric with the second alignment surface 175. The end surface (lower end surface) of the protrusion 174 is a flat surface that is substantially orthogonal to the through-hole 122*a*.

On the upper surface of the diaphragm cover 170, a cylindrical portion 177 protruding upward is provided concentric with the through-hole 120*a*.

The cylindrical portion 177 is inserted on the inner circumferential side of the protrusion 174 of the cover flange 172. The outer circumferential surface of the cylindrical portion 177 comprises a cylindrical surface having a diameter substantially the same as the inner diameter of the protrusion 174 of the cover flange 172. This outer circumferential surface comprises a third alignment surface 179 that receives the third alignment reference surface 176 of the cover flange 172 to align the cover flange 172 concentric with the through-hole 120*a*.

Here, on the upper surface of the diaphragm cover 170, the ring-shaped portion located on the outer circumferential side of the cylindrical portion 177 is a flat surface substantially orthogonal to the through-hole 120*a*.

The outer circumferential surface of the diaphragm cover 170 is received by the inner surface of the cover 123 installed on the body 112, and the through-hole 120*a* is aligned concentric with the diaphragm needle 114.

On the upper surface of the cover flange 172, a guide pin 184 is disposed substantially parallel to the axis of the rotary shaft 115*a* of the motor 115. The inner circumferential surface of the branching portion of the slider 117 contacts the outer circumferential surface of the guide pin 184 instead of the outer circumferential surface of the motor shaft 131. In this way, the rotary shaft 115*a* and the slider 117 are prevented from rotating together.

At the upper edge of the guide pin 184, a stopper 185 that extends out to the upper surface of the slider 117 to receive the upper surface of the slider 117 is provided.

The stopper 185 receives the slider 117 before the slider 117 contacts the base of the protrusion 116*b* of the coupling 116 so as to prevent the slider 117 from ascending farther when the slider 117 ascends by rotating the rotary shaft 115*a* of the motor 115.

With the flow-rate control valve 160 having such a structure, by inserting the cylindrical portion 162 of the motor 115 into the inner flange 182 of the housing 181 when the motor 115 is attached to the body 112, the first alignment reference surface 163 of the motor 115 is received by the first alignment surface 186 of the housing 181 so that the rotary shaft 115*a* of the motor 115 is concentric with the axis of the inner flange 182 of the housing 181 and the protrusion 183.

In this state, by inserting the cylindrical portion 173 of the cover flange 172 on the inner circumferential side of the protrusion 183 of the housing 181, the second alignment reference surface 187 of the housing 181 is received by the second alignment surface 175 of the cover flange 172 so that the protrusion 183 of the housing 181 is concentric with the cylindrical portion 173, the protrusion 174, and the through-hole 122*a* of the cover flange 172. In other words, the rotary shaft 115*a* of the motor 115 is concentric with the cylindrical portion 173, the protrusion 174, and the through-hole 122*a* of the cover flange 172.

In this state, by inserting the cylindrical portion 177 of the diaphragm cover 170 on the inner circumferential side of the protrusion 174 of the cover flange 172, the third alignment reference surface 176 of the cover flange 172 is received by the third alignment surface 179 of the diaphragm cover 170, and the protrusion 174 of the cover flange 172 is positioned concentric with the cylindrical portion 177 of the diaphragm cover 170 and the through-hole 120*a*. In other words, the rotary shaft 115*a* of the motor 115 is concentric with the cylindrical portion 177 of the diaphragm cover 170 and the through-hole 120*a*.

Since the diaphragm cover 170 is aligned with respect to the body 112 such that the through-hole 120*a* is concentric with the diaphragm needle 114, the rotary shaft 115a of the motor 115 is also concentric with the diaphragm needle 114.

In this way, with the flow-rate control valve 160 according to this embodiment, the motor 115, the housing 181, the cover flange 172, and the diaphragm cover 170 are each connected by a so-called spigot coupling, and by merely connecting these members, the position and the orientation of the motor 115 with respect to the body 112 is set in a manner suitable for the driving of the diaphragm needle 114. Consequently, position and orientation adjustment operations of the motor 115 with respect to the body 112 are unnecessary.

Therefore, according to the flow-rate control valve 160, highly accurate assembly can be easily and quickly carried out during production and maintenance, regardless of the technical skills of the assembly worker. Accordingly, the flow-rate control valve 160 has excellent productivity and operability, has less variation in the assembly accuracy for each product or maintenance operation, and is capable of ensuring high performance as a flow-rate control valve.

Each of the above-described alignment reference surfaces is not limited to the above-described cylindrical surface or cylindrical inner surface and may be formed of one or more curved surfaces or a plurality of flat surface in which at least one surface is disposed in a direction different from the other surfaces. When the alignment reference surface is a curved surface, the corresponding alignment surface is formed of a curved surface having the same curvature in the opposite direction.

When the alignment reference surface provided on the motor or a fixing member is formed of a plurality of flat surfaces, the alignment surface for the connected member is formed of a plurality of flat surfaces corresponding to the alignment reference surface.

In this flow-rate control valve 160, since the stopper 185 is provided on the guide pin 184 for preventing the slider 117 from rotating together, when the slider 117 ascends, interference at the slider 117 and the base of the protrusion 116b of the coupling 116 is prevented, the problem of these members over-engaging can be reliably prevented, and excellent operation can be always carried out.

The structure characteristic to this embodiment is not limited to the flow-rate control valve 150 according to the third embodiment but may also be applied to the flow-rate control valve 110 according to the second embodiment.

Fifth Embodiment

Figure 10:
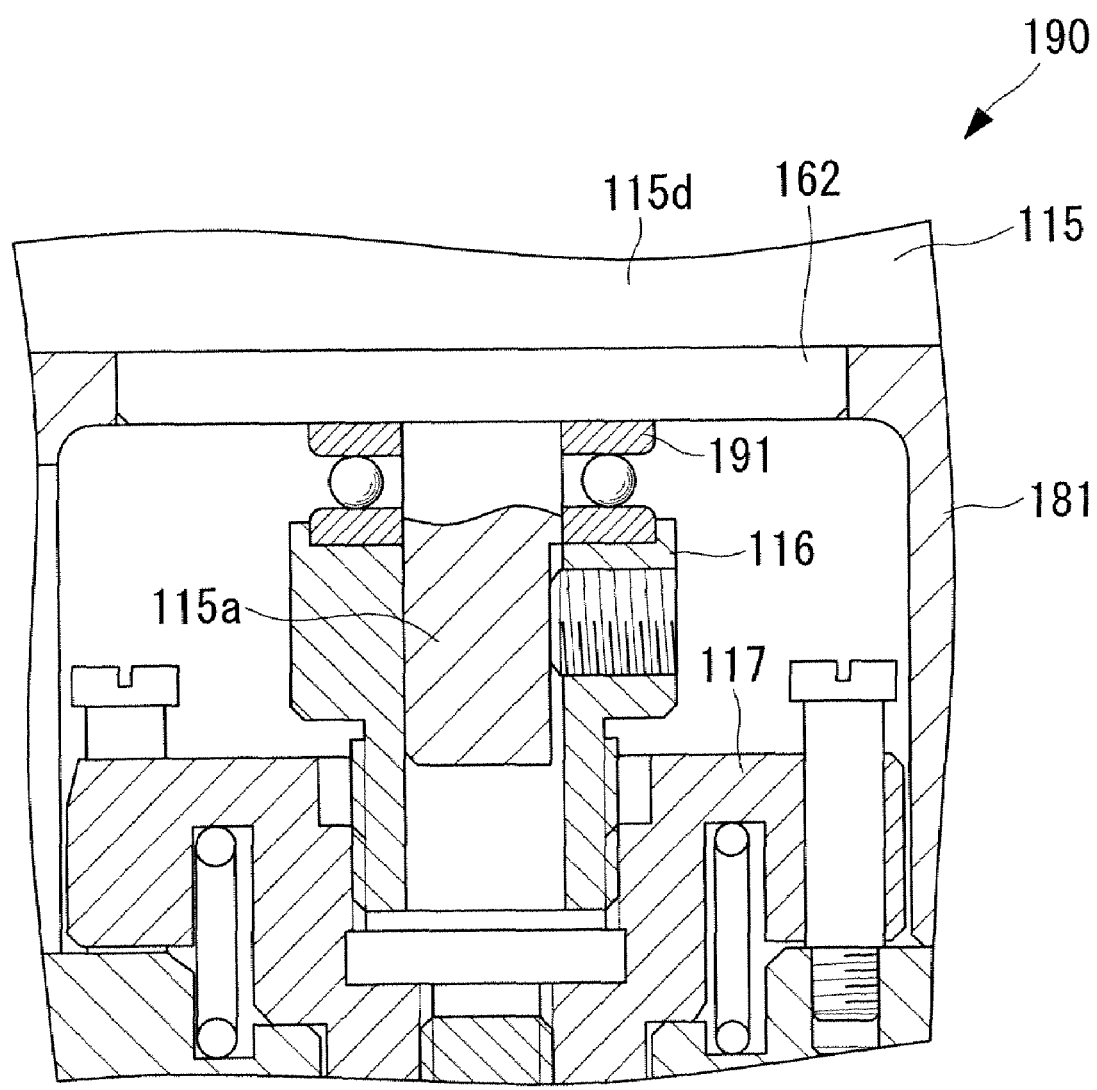
FIG. 10 is a longitudinal cross-sectional view of a flow-rate control valve of a flow-rate control system according to a fifth embodiment of the present invention.

Another embodiment of a flow-rate control system according to the present invention will be described below with reference to FIG. 10.

The flow-rate control system according to this embodiment is mainly characterized in that, in the flow-rate control system according to the fourth embodiment, a flow-rate control valve 190 is used instead of the flow-rate control valve 160.

The flow-rate control valve 190 is mainly characterized in that, in the flow-rate control valve 160 according to the fourth embodiment, a thrust bearing 191 for receiving the thrust load applied to the rotary shaft 115a is provided on the outside of a motor main body 15d of the motor 115.

Hereinafter, the same reference numerals are used to represent members that are the same as those of the flow-rate control valve 160 according to the fourth embodiment, and detailed descriptions thereof are omitted.

According to this embodiment, the thrust bearing 191 is interposed between the lower surface of the cylindrical portion 162 of the motor 115 and the upper surface of the coupling 116.

With the flow-rate control valve 190 having such a structure, when the diaphragm needle 114 receives pressure from a fluid, the thrust load that is to be transmitted to the rotary shaft 115a via the diaphragm needle 114, the slider 117, and the coupling 116 is received by the thrust bearing 191 provided on the outside of the motor main body 15d and is released to the motor main body 15d. Therefore, the load applied to the support structure of the rotary shaft 115a in the motor 115 is reduced, and thus the performance of the motor 115 can be maintained for a long period of time.

The structure characteristic to this embodiment is not limited to the flow-rate control valve 160 according to the fourth embodiment but may also be employed in the flow-rate control valve 110 according to the second embodiment or the flow-rate control valve 150 according to the third embodiment.

Sixth Embodiment

Figure 11:
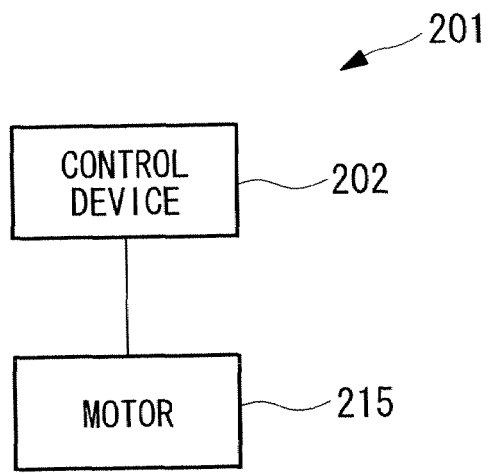
FIG. 11 is a longitudinal cross-sectional view of a flow-rate control valve of a flow-rate control system according to a sixth embodiment of the present invention.

Another embodiment of a flow-rate control system according to the present invention will be described below with reference to FIGS. 11 and 12.

The flow-rate control system according to this embodiment is mainly characterized in that a flow-rate control valve 201 is used as the flow-rate control valve in one of the flow-rate control systems according to the second, third, fourth and fifth embodiments.

The flow-rate control valve 201 is mainly characterized in that the motor 115 comprises a stepping motor and a control device 202 for controlling the operation of the motor 115 is provided in one of the flow-rate control systems according to the second, third, fourth and fifth embodiments.

To calibrate the position of the diaphragm needle 114, the control device 202 inputs a pulsed signal having a number of pulses for rotating the rotary shaft 115a of the motor 115 by an angle required to move the diaphragm needle 114 from one end to the other end of the movable range of the diaphragm needle 114, determines that the diaphragm needle 114 is positioned at the other end of the movable range when the rotary shaft 115a stops, and subsequently controls the position of the diaphragm needle 114 within the movable range.

More specifically, to calibrate the position of the diaphragm needle 114, the control device 202 inputs a pulsed signal having a predetermined number of pulses to the motor 115 so as to rotate the rotary shaft 115a of the motor 115 by an angle required to move the diaphragm needle 114 from one end to the other end of its movable range (this angle is obtained from the design information of the flow-rate control valve 201).

Figure 12:
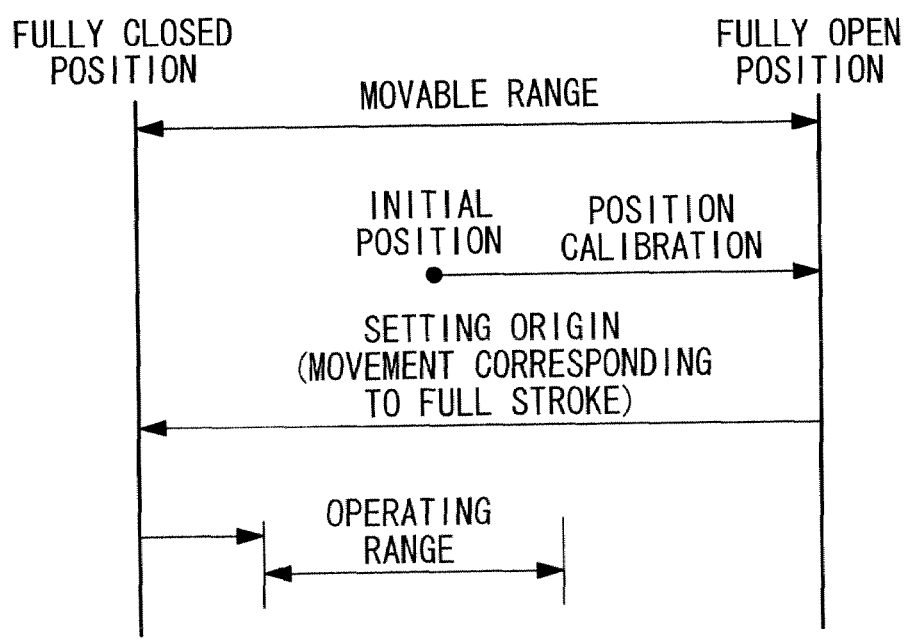
FIG. 12 illustrates the operation of the flow-rate control valve shown in FIG. 11.

According to this embodiment, as shown in FIG. 12, to calibrate the position of the diaphragm needle 114, the control device 202 moves the diaphragm needle 114 to a fully open position by rotating the rotary shaft 115a in the direction in which the diaphragm needle 114 moves toward the open side (upward in FIGS. 4, 5, 6, 8, and 10) in the movable range.

In this way, when the rotation of the rotary shaft 115a is completed, the diaphragm needle 114 is positioned at the other end of the movable range, regardless of the position (initial position) at the beginning of the position calibration operation. When the diaphragm needle 114 is at a position other than an end of the movable range when the position calibration operation of the diaphragm needle 114 begins, the diaphragm needle 114 reaches the other end of the movable range and cannot move farther before the rotary shaft 115a is rotated by an angle corresponding to all of the pulses in the pulsed signal input to the motor 115. As a result, after that point, the rotary shaft 115a does not rotate anymore, regardless of the number of remaining pulses.

In this way, after the diaphragm needle 114 is positioned at the other end of the movable range, the control device 202 determines that the diaphragm needle 114 is positioned at the other end of the movable range and carries out position control of the diaphragm needle 114 within the movable range.

According to this embodiment, the control device 202 carries out necessary control by inputting to the motor 115 a pulsed signal having a sufficient number of pulses for moving the diaphragm needle 114 to an end of the movable range (fully closed position) after the rotary shaft 115a is stopped, setting the position where the rotary shaft 115a stopped as the origin of the position control of the diaphragm needle 114, and then moving the diaphragm needle 114 within an operating range that is set in advance.

When the diaphragm needle 114 is within the movable range, since the rotary shaft rotates by an angle corresponding to all of the pulses in the pulsed signal input to the motor 115, a constant relationship is established between the number of pulses in the pulsed signal and the position of the diaphragm needle 114.

In this way, in the flow-rate control valve 201 according to this embodiment, once the diaphragm needle 114 is positioned at the other end of the movable range, the position of the diaphragm needle 114 can be specified on the basis of the number of pulses in the pulsed signal subsequently input to the motor 115. Accordingly, the position of the diaphragm needle 114 can be accurately determined without using a rotary encoder.

According to this embodiment, to calibrate the position of the diaphragm needle 114, the diaphragm needle 114 is moved to the open side of the movable range or, in other words, in the direction that avoids interference with the needle storing portion 143a of the flow-rate control valve 201. Therefore, even when position calibration of the diaphragm needle 114 is repeated, the diaphragm needle 114 and the body 112 are less likely to experience wear.

When the technology according to this embodiment is applied to the flow-rate control valve according to the second or third embodiment, the control device 202 may be configured such that, when at least the diaphragm needle 114, near the end of its movable range, moves toward the end of the movable range, the rotary shaft 115a of the motor 115 is rotated by a first driving torque and, when the diaphragm needle 114 moves away from the end of the movable range, the rotary shaft 115a of the motor 115 is rotated by a second driving torque that is greater than the first driving torque.

In such a case, to move the diaphragm needle 114 away from the end of the movable range, the control device 202 controlling the operation of the motor 115 operates the motor 115 by a second driving torque greater than the driving torque (first driving torque) for moving the diaphragm needle 114 to the end of its movable range.

In this way, in the flow-rate control valve, over-screwing can be easily eliminated even when over-screwing of the threaded portion occurs when the diaphragm needle 114 is moved to the end of the movable range.

The driving force of the motor 115 is proportional to the driving current supplied to the motor 115.

Accordingly, to achieve the above-described control, the control device 202 may be configured such that, when the diaphragm needle 114 is moved to an end of the movable range, the output limit value of the driving current for the motor 115 is set to a first limit value V1 and, when the diaphragm needle 114 is moved away from the end of the movable range, the output limit value is set to a second limit value V2 that is greater than the first limit value V1.

In the motor 115, the slower the rotation of the rotary shaft 115a is, the greater the torque is for driving the rotary shaft 115a.

Accordingly, to achieve the above-described control, the control device 202 may be configured such that, when the diaphragm needle 114 is moved to an end of the movable range, the rotary shaft 115a of the motor 115 is rotated at a first rotational speed R1 and, when the diaphragm needle 114 is moved away from the end of the movable range, the rotary shaft 115a of the motor 115 is rotated at a second rotation speed R2 that is slower than the first rotational speed R1.

The present invention is not limited to the embodiments described above, and various modifications may be made within the scope of the invention.

The invention claimed is:

1. A flow-rate control system for controlling a minute flow rate of a fluid flowing through a fluid channel having an outlet environment of constant pressure, the flow-rate control system comprising:
   a flow-rate measurement conduit portion having a predetermined length connected to an outlet-side end of the fluid channel and whose outlet environment is set to constant pressure by setting the cross-sectional area of a channel smaller than the fluid channel;
   a pressure detection part for detecting the pressure of the fluid at the upstream side of the flow-rate measurement conduit portion by being disposed near an outlet of the fluid channel;
   a pressure/flow-rate conversion part for calculating a flow rate from a fluid pressure detected at the pressure detection part;
   a flow-rate control valve that is connectable to the pressure/flow-rate conversion part; and
   a block-shaped body, one surface of which is provided with the flow-rate control valve and the flow meter, and inside of which is provided the fluid channel connecting the flow-rate control valve and the flow meter;
   wherein the fluid channel includes
      a first inclined channel gradually inclined to an area in which the flow meter is provided, the first inclined channel being inclined from an area of the surface where the flow-rate control valve is provided to the inside of the body, and
      a second inclined channel gradually inclined to an area in which the flow-rate control valve is provided, the second inclined channel being inclined from an area of the surface where the flow meter is provided to the inside of the body, the second inclined channel being connected to an end of the first inclined channel.

2. The flow-rate control system according to claim 1, wherein the outlet environment of constant pressure is atmospheric pressure due to an opening to the atmosphere.

3. The flow-rate control system according to claim 1, wherein at least part of the fluid channel is inclined such that the outlet side is positioned above the inlet side.

4. The flow-rate control system according to claim 1, further comprising:
   a base, the body being placed on an upper surface of base, wherein the upper surface of the base comprises an inclined surface gradually inclined upward from the inlet side of the fluid channel to the outlet side of the fluid channel.

5. The flow-rate control system according to claim 1,
wherein the flow-rate control valve includes
- a motor attached to the body, and
- a valve element connected to a rotary shaft of the motor with a threaded portion, wherein an alignment reference surface is provided on the motor, wherein a fixing member for fixing the motor is provided on the body, and wherein the fixing member includes an alignment surface for aligning the motor by receiving the alignment reference surface of the motor and setting at least one of the position and the orientation of the rotary shaft in a manner suitable for driving the valve element.

6. The flow-rate control system according to claim 5,
wherein the alignment reference surface of the motor comprises a cylindrical surface or a cylindrical inner surface parallel to the rotary shaft, wherein the alignment surface of the fixing member comprises a cylindrical inner surface or a cylindrical surface that is parallel to the driving direction of the valve element and has the same shape as the alignment reference surface, and the position and the orientation of the rotary shaft are set when the alignment surface receives the alignment reference surface.

7. The flow-rate control system according to claim 5, further comprising:
a stopper for allowing the movement of the valve element within a predetermined operating range and limiting the movement outside the operating range by receiving the valve element upon reaching the end of the operating range.

8. The flow-rate control system according to claim 5, further comprising:
a control device for controlling the operation of the motor,
wherein the control device operates the motor by a first driving torque when at least the valve element, when near the end of its movable range, moves to the end, and
wherein the control device operates the motor by a second driving torque greater than the first driving torque when the valve element moves away from the end of the movable range.

9. The flow-rate control system according to claim 5,
wherein
the valve element comprises a needle of a needle valve,
the motor comprises a stepping motor for rotating the rotary shaft by an angle proportional to the number of pulses in an input pulsed signal,
a control device for controlling the position of the valve element by controlling the operation of the motor is provided,
to carry out position calibration of the valve element, the control device inputs, to the motor, a pulsed signal having a number of pulses for rotating the rotary shaft by an angle required for moving the valve element from one end to the other end of its movable range, and
the control device determines that the valve element is positioned at the other end of the movable range at the position where the rotary shaft stopped and carries out subsequent position control of the valve element within the movable range.

10. The flow-rate control system according to claim 9, wherein, to carry out position calibration of the valve element, the control device rotates the rotary shaft in a direction in which the valve element moves toward the open side of the movable range.

11. The flow-rate control system according to claim 9,
wherein the control device operates the motor by a first driving torque when at least the valve element, when near the end of its movable range, moves to the end, and
wherein the control device operates the motor by a second driving torque greater than the first driving torque when the valve element moves away from the end of the movable range.

12. The flow-rate control system according to claim 5, wherein a thrust bearing for receiving a thrust load applied to the rotary shaft is provided on the outside of a motor main body of the motor.

13. The flow-rate control system according to claim 1, wherein the fluid is a liquid.

* * * * *